US011161158B1

(12) United States Patent
Hu et al.

(10) Patent No.: US 11,161,158 B1
(45) Date of Patent: Nov. 2, 2021

(54) HOUSEHOLD ELECTRIC SANITIZING DEVICE AND METHOD

(71) Applicants: Yuhong Hu, Brea, CA (US); Terrance Mulgrew, Wexford, PA (US)

(72) Inventors: Yuhong Hu, Brea, CA (US); Terrance Mulgrew, Wexford, PA (US)

( * ) Notice: Subject to any disclaimer, the term of this patent is extended or adjusted under 35 U.S.C. 154(b) by 0 days.

(21) Appl. No.: 16/865,104

(22) Filed: May 1, 2020

(51) Int. Cl.
| | | |
|---|---|---|
| *A47L 9/28* | (2006.01) | |
| *B08B 7/04* | (2006.01) | |
| *B08B 7/00* | (2006.01) | |
| *A23L 3/28* | (2006.01) | |
| *A23L 3/3445* | (2006.01) | |
| *B08B 3/02* | (2006.01) | |

(52) U.S. Cl.
CPC ........... *B08B 7/04* (2013.01); *A23L 3/28* (2013.01); *A23L 3/3445* (2013.01); *B08B 3/02* (2013.01); *B08B 7/0057* (2013.01); *A23V 2002/00* (2013.01)

(58) Field of Classification Search
None
See application file for complete search history.

(56) References Cited

U.S. PATENT DOCUMENTS

| | | | |
|---|---|---|---|
| 6,919,032 B2 | 7/2005 | Mulgrew | |
| 7,493,906 B2 | 2/2009 | Mulgrew | |
| 2003/0170359 A1* | 9/2003 | Garwood | ............... A23L 13/00 426/392 |

OTHER PUBLICATIONS

Yu-Hsin Pang and Yen-Con Hung, Efficacy of Slightly Acidic Electrolyzed Water and UV-Ozonated Water Combination for Inactivating *Escherichia coli* O157:H7 on Romaine and Iceberg Lettuce during Spray Washing Process, Journal of Food Science, May 12, 2016, M1-M6, vol. 00, Nr.0, Institute of Food Technologists, Chicago, US, 6 pages.

* cited by examiner

*Primary Examiner* — Eric W Golightly
(74) *Attorney, Agent, or Firm* — Cionca IP Law P.C.; Marin Cionca

(57) ABSTRACT

An electric sanitizing device and method for cleaning an item, the electric sanitizing device comprising: a lid having an ultraviolet lamp disposed above a transparent glass window, a spray nozzle, and a vent housing an activated carbon filter; a body attached below the lid, the body comprising a cleaning chamber having a contact tank, a dispersion stone and a water inlet, a retention plate, a filter plate sitting atop the retention plate, a basket sitting atop the filter plate, and a control panel; and an electronics compartment disposed below the body, the electronics compartment comprising an ozone generator having an air pump, a rotating motor adapted to rotate the basket, a water pump adapted to pump water to the spray nozzle, and a controller adapted to operate the ozone generator, the UV lamp, the rotating motor and the water pump according to a user's commands entered via the control panel.

9 Claims, 14 Drawing Sheets

HOUSEHOLD ELECTRIC SANITIZING DEVICE AND METHOD

BACKGROUND OF INVENTION

1. Field of the Invention

The invention relates generally to the sterilization and purification of food products, consumer items and certain electronic devices, and more specifically to the use of an electric, automated device to sanitize and purify food products, consumer items and certain electronic devices.

2. Description of the Related Art

Currently, there is a lack of an efficient and effective household method of reducing harmful bacteria and/or virus contamination of food products and various consumer items. For example, lettuce, a popular and important vegetable product grown and sold in the U.S. by the millions of tons annually, can become contaminated during growth with foodborne pathogens. As such, lettuce, and similarly grown food products, can act as a carrier for transmitting foodborne pathogens to humans. In 2011, the Centers for Disease Control and Prevention (CDC) reported an outbreak of *Escherichia coli* (*E. coli*) in multiple states across the country, which was found to be directly linked to romaine lettuce. The CDC stated that pathogenic microorganisms like *E. coli* could attach to fresh vegetables during farming and postharvest storages. Thus, an effective washing method after harvest may be necessary to prevent the wide spread of foodborne outbreaks by increasing the purification of fresh produce.

Furthermore, as evidenced by the rapid spread of infectious diseases like COVID-19, common household items like electronic devices and consumer products can be carriers of transmittable bacteria and viruses. Dangerous disease-causing viruses and/or bacteria can live on a hard surface, such as the screen of a cellphone, the mouth of a bottle, or on the top of a toy car for up to hours on end. Once these viruses or bacteria get transferred from the hard surface to an individual's body (by touching one's face with contaminated hands, for example), that individual may be likely to continue the spread by infecting other individuals. Thus, there may be a need for an effective sanitation method to cleanse common household items to reduce the spread of infectious diseases.

Current methods may involve subjecting food products to ozonated water in a treatment chamber to destroy organic contaminants on the food products. Ozone, a naturally occurring form of oxygen, is a powerful disinfectant capable of killing microbial contaminants by rupturing the cellar membrane, making reactivation of the cell of the microbial contaminants impossible. Furthermore, ozone leaves no chemical residue on foods and does not alter the food product characteristics. However, such known methods may only be applicable in treating food items and dishes/utensils. The use of ozonated water as described above to treat electronic devices, for example, will damage and/or destroy the electronic devices, rather than sanitize them. Furthermore, such known methods may not be offered in a consumer product and may utilize higher levels of ozone due to the current industrial applicability of the methods. Further, ozone gas that is naturally released via off-gassing may be toxic if released in the confined spaces of a household.

Therefore, there is a need to solve the problems described above by providing a household electric sanitizing device and method for automated, non-thermal organic disinfecting and sanitizing of food products, as well as various plastic articles and certain electronic devices.

The aspects or the problems and the associated solutions presented in this section could be or could have been pursued; they are not necessarily approaches that have been previously conceived or pursued. Therefore, unless otherwise indicated, it should not be assumed that any of the approaches presented in this section qualify as prior art merely by virtue of their presence in this section of the application.

BRIEF INVENTION SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

In an aspect, a household electric sanitizing device is provided for improving food and household safety. The household electric sanitizing device may be formed by a vertically integrated compact design comprising: a lid compartment, a treatment zone and an electronic compartment. The lid compartment may comprise an ultraviolet lamp, a spray nozzle, a vent housing an activated carbon filter, and a pushbutton. The treatment zone may comprise a body, the body comprising: a cleaning chamber and a contact tank within a bottom portion of the cleaning chamber, a dispersion stone and a water inlet disposed in the bottom floor, a retention plate sitting atop the bottom floor, a filter plate sitting atop the retention plate, a basket sitting atop the filter plate and being adapted to rotate, and a control panel having a display screen, the control panel being adapted to receive a user's commands. The electronics compartment may be disposed below the body in a base, and may comprise: an ozone generator having an air pump, a rotating motor adapted to rotate the basket, a water pump being in fluid communication with the spray nozzle and the contact tank, and a controller adapted to operate the ozone generator, the UV lamp, the rotating motor and the water pump according to the user's commands. Thus, an advantage is that the device can treat food items, various household items and certain electronic devices to kill bacteria or viruses. Another advantage is the availability of the device for convenient use in the user's home. An additional advantage is the reduction in the amount of off-gassing or evaporation in the liquid used to treat the food items and consumer items. Another advantage is the minimal and therefore efficient use of water as part of the treatment process.

In another aspect, a two-stage off-gas destruct system is provided with a UVC lamp and an activated carbon filter. The UVC lamp may emit light rays at wavelengths about 254 nm in length. The UVC light rays may cause ozone gas dissolved in water to form hydroxyl radicals for disinfecting the surface of an item. The UVC light rays and the activated carbon filter may also convert excess ozone into oxygen for safe emission of the ozone gas into the air. The two-stage off-gas destruct system is implemented into a household electric sanitizing device. Thus, an advantage is that food items, various household items and certain electronic devices can be treated in a single device to kill bacteria or viruses. An additional advantage is the reduction in the amount of off-gassing or evaporation in the liquid used to treat the food items and consumer items.

In another aspect, a method of operating a household electric sanitizing device for improving food and household safety is provided. The method may comprise the steps of: receiving an electric sanitizing device, the electric sanitizing device comprising a lid having a UV lamp, a body having an interior cleaning chamber, and a base housing an ozone generator; rinsing the item under tap water and loading the item into a basket in the cleaning chamber; providing the cleaning chamber with potable water or ice; and operating the electric sanitizing device via a control panel disposed in a side of the body, the control panel being in electrical communication with a controller in the base. The control panel may comprise a display screen and may be provided with buttons for a user to press to automatically or manually clean the item in the basket. The user may remove the item from the electric sanitizing device once the device indicates to the user that the item has been cleaned. Thus, an advantage is that food items, various household items and certain electronic devices can be treated in a single device to kill bacteria or viruses. Another advantage is the availability of the device for convenient use in the user's home. An additional advantage of the method is the reduction in the amount of off-gassing or evaporation in the liquid used to treat the food items and consumer items. Another advantage is the minimal and therefore efficient use of water as part of the treatment process. Thus, an advantage is that the sanitizing device may offer the user a straightforward, intuitive interface for operating the device.

In another aspect, a method of cleaning an item for improving food and household safety is provided with a household electric sanitizing device. The household electric sanitizing device may comprise a lid having: a UV lamp, a vent housing an activated carbon filter, and a spray nozzle. The electric sanitizing device may further comprise a body having: a cleaning chamber, a dispersion stone and water inlet, a rotating basket, a retention plate and a filter plate, and a control panel. The electric sanitizing device may further comprise a base housing an electronics compartment, the electronics compartment comprising: an ozone generator with an air pump, a water pump, a rotating motor, and a controller. The method may comprise the steps of: activating the ozone generator, the water pump, the UV lamp, and the rotating motor; after a first period of time, deactivating the water pump and the ozone generator; after a second period of time, deactivating the air pump, the UV lamp and the rotating motor; and powering down the electric sanitizing device. Thus, an advantage is that food items, various household items and certain electronic devices can be treated in a single device to kill bacteria or viruses. Another advantage is the availability of the device for convenient use in the user's home. An additional advantage of the method is the reduction in the amount of off-gassing or evaporation in the liquid used to treat the food items and consumer items. Another advantage is the minimal and therefore efficient use of water as part of the treatment process.

The above aspects or examples and advantages, as well as other aspects or examples and advantages, will become apparent from the ensuing description and accompanying drawings.

BRIEF DESCRIPTION OF THE DRAWINGS

For exemplification purposes, and not for limitation purposes, aspects, embodiments or examples of the invention are illustrated in the figures of the accompanying drawings, in which.

DETAILED DESCRIPTION

Figure 1:
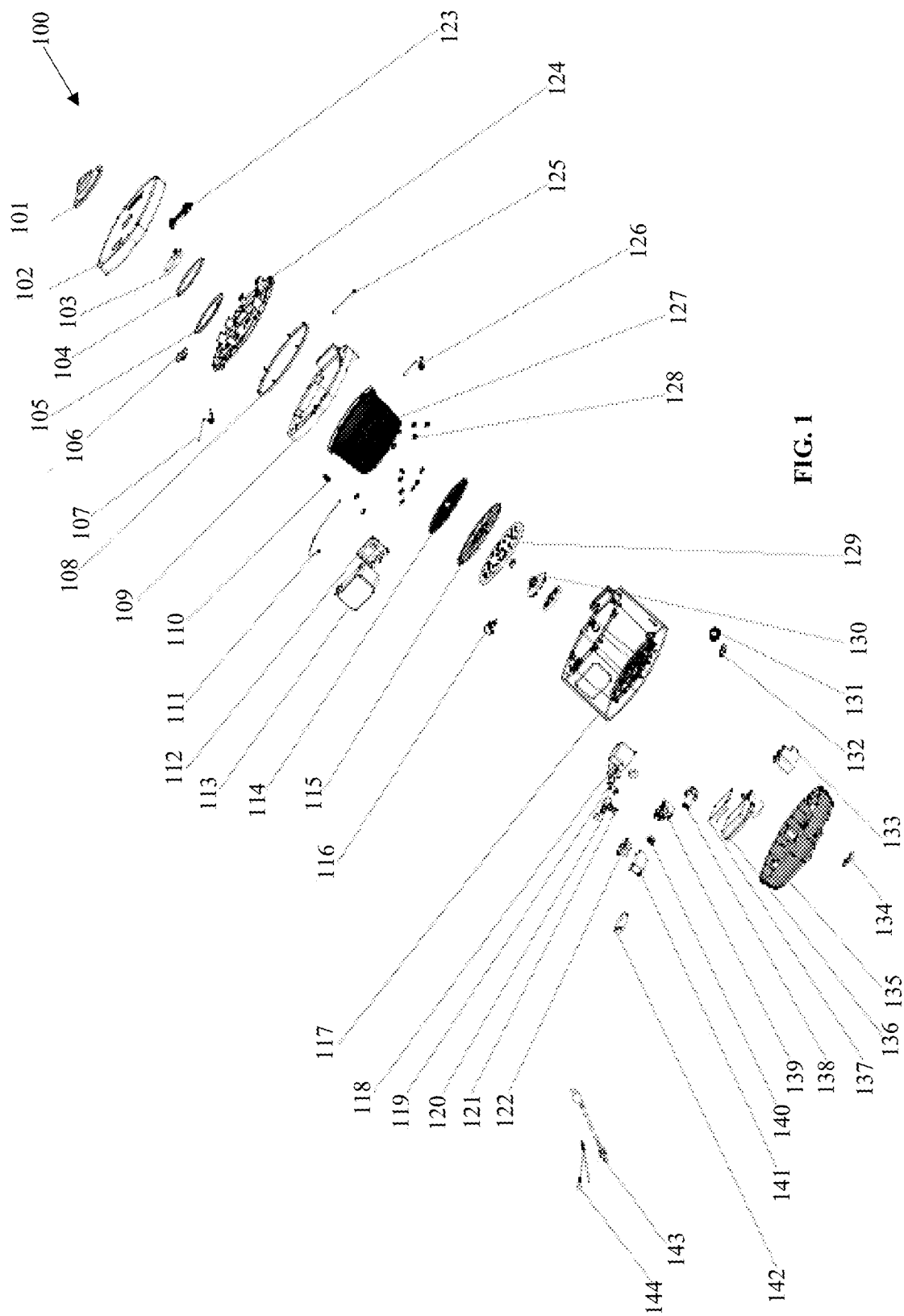
FIG. 1 illustrates an exploded perspective view of an electric sanitizing device, according to an aspect.

What follows is a description of various aspects, embodiments and/or examples in which the invention may be practiced. Reference will be made to the attached drawings, and the information included in the drawings is part of this detailed description. The aspects, embodiments and/or examples described herein are presented for exemplification purposes, and not for limitation purposes. It should be understood that structural and/or logical modifications could be made by someone of ordinary skills in the art without departing from the scope of the invention. Therefore, the scope of the invention is defined by the accompanying claims and their equivalents.

It should be understood that, for clarity of the drawings and of the specification, some or all details about some structural components or steps that are known in the art are not shown or described if they are not necessary for the invention to be understood by one of ordinary skills in the art.

"Logic" as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

For the following description, it can be assumed that most correspondingly labeled elements across the figures (e.g., 100 and 200, etc.) possess the same characteristics and are subject to the same structure and function. If there is a difference between correspondingly labeled elements that is not pointed out, and this difference results in a non-corresponding structure or function of an element for a particular embodiment, example or aspect, then the conflicting description given for that particular embodiment, example or aspect shall govern.

FIG. 1 illustrates an exploded perspective view of an electric sanitizing device 100, according to an aspect. As shown in FIG. 1, the electric sanitizing device ("electric sanitizing device," "household electric sanitizing device," "sanitizing device") 100 may comprise a plurality of exemplary components 101-144, as an example. As shown, the electric sanitizing device 100 may be provided with a lid compartment ("lid compartment," "lid") having a cover, the cover comprising a central lighting part ("central lighting part," "center part," "center light," "center portion," "viewing portal") 101 and a top cover frame ("top cover frame," "top cover," "cover frame) 102, as an example. The lid of the sanitizing device 100 may further comprise a UV lamp 103 disposed beneath the central part 101. As will be discussed in further detail later, the central part 101 may be made from transparent material to allow the operating of the UV lamp 103 to be visible by the user, as an example. The lid compartment of the sanitizing device 100 may further comprise: a filter cover 123, two seal rings 104, 105, a pushbutton 106, a body 124, a left torsional spring 107, a third seal ring 108, an axle 125 for opening or closing the cover, and a bracket 109 disposed at the base of the cover. As will be discussed in more detail in this disclosure, each of the above-mentioned exemplary components may form the cover of the electric sanitizing device 100.

As shown in FIG. 1, the electric sanitizing device 100 may further comprise a number of exemplary components that make up the treatment zone of the device, as an example. As shown, the treatment zone of the electric sanitizing device 100 may comprise: an internal basket 127, a compression spring 110, a right torsional spring 126, a handle 111 attaching to the basket 127, a plurality of foot pads 128, a display board 112 and a control panel 113 in electrical connection with the display board 112, an isolation plate 114, a filter plate 115, a drain board 129, a buckle 116, a first axle seat 130, a body housing ("body housing," "body") 117, a first bracket 118, a water wave 119, a pipe joint 120, a drain nozzle 121, a fixing bracket 122 for pumps, a rotary knob 131, a coupling 132, and a second bracket 133. As mentioned previously, each of the above-mentioned exemplary components may form the treatment zone of the sanitizing device 100. The functionality, importance and particular structural arrangement of the exemplary components will be described in greater detail throughout this disclosure.

As shown, the electric sanitizing device 100 may be provided with an electronic compartment disposed below the body, as an example. As shown in FIG. 1, the electronic compartment of the sanitizing device 100 may comprise: a base housing ("base housing," "bottom base," "bottom") 135, a power cord fixing 134, an electric control box 136, a power board 137, a spray pump 138, an air pump 139, a connection terminal 140, an ozone generator 141, a ballast 142 for the UV lamp 103, a power cord 143, and an inner connection wire 144. As mentioned previously, each of the above-mentioned exemplary components may form the bottom electronic component of the electric sanitizing device 100. The functionality, importance and particular structural arrangement of the exemplary components will be discussed in more detail throughout this disclosure.

As will be described in greater detail throughout this disclosure, the electric sanitizing device 100 may be adapted to sanitize and purify various items such as food products, like fruits and vegetables, consumer items, like toys, utensils, dishes, and electronic devices, like cellphones and tablets. The electric sanitizing device 100 is designed to operate efficiently in a user's home, such as in the kitchen, and is a compact device that may sit on a countertop, as an example. The electric sanitizing device 100 may be provided with a treatment process that combines water, germicidal UV light and activated oxygen that has been approved by the Food and Drug Administration (FDA) and the United States Department of Agriculture (USDA), and meets the USDA Organic standards for contacting food products, including fruits and vegetables, as an example. As is known in the art, super activated water and germicidal UV light minimizes harmful bacteria, germ, and pesticides by up to 99.99%. The CDC has estimated that approximately 48 million Americans contract foodborne illnesses from bacteria associated with fresh produce each year. As such, there is a need for a household appliance that may be operated in a consumer's home in the US.

Figure 2A:
FIGS. 2A-2B illustrate a front perspective view and a side perspective view, respectively, of an electric sanitizing device in a closed state, according to an aspect.
Figure 2B:
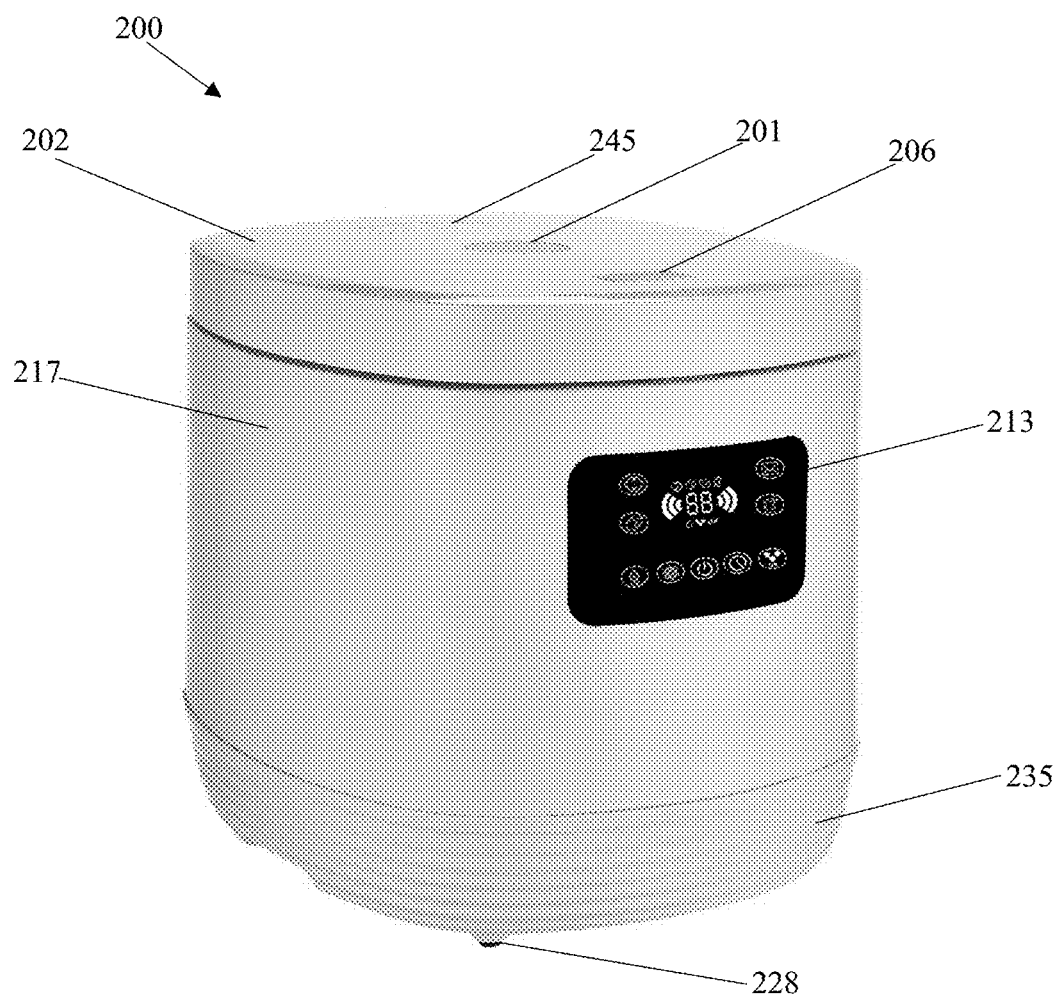

FIGS. 2A-2B illustrate a front perspective view and a side perspective view, respectively, of an electric sanitizing device 200 in a closed state, according to an aspect. As shown in FIGS. 2A-2B, the electric sanitizing device 200 may be a compact device that could sit on a countertop in a user's kitchen, as an example. Thus, an advantage is that a user could conveniently purify and treat food products and consumer items automatically in a single device. As an example, the electric sanitizing device 200 may comprise each of the exemplary components illustrated in FIG. 1 within the device 200, such that the exterior of the device appears sleek and attractive to the user when the device rests in a closed state, as shown.

As previously described when referring to FIG. 1, the electric sanitizing device 200 may be provided with a top cover 202, a body 217 and a bottom base 235, as shown in FIGS. 2A-2B. As shown as an example, the top cover 202 may be provided with a vent 245, a central light 201 and a top pushbutton 206. As will be discussed in greater detail below, oxygen and residual heat may be dissipated through the vent 245 following the cleansing and purification processes, as an example. Light may be emitted from the center light 201 to indicate operation of the device for the user, and the pushbutton 206 may be actuated by the user to open the top cover 202, as an example. The lid of the device 200 may be attached to the body via an axle (shown by 125 in FIG. 1) or swivel or any suitable pivotal means, such that the lid may be engaged or locked into the body when the lid is properly closed, thus forming an airtight seal between the lid and the body, as an example.

As shown in FIGS. 2A-2B, the body 217 of the sanitizing device 200 may be provided with a control panel 213, as an example. As will be discussed later in this disclosure, the control panel 213 may allow the user to operate the device 200 to clean various items placed within the device, as an example. As will be discussed below, the control panel 213 may also be provided with a display screen and a plurality of buttons to allow the user and the device to communicate, as an example. As shown in FIG. 2B, the bottom base 235 of the electric sanitizing device 200 may be provided with a plurality of foot pads 228. As shown, the plurality of foot pads 228 may allow the sanitizing device 200 to sit flush atop a surface, such as a countertop. The plurality of foot pads 228 may each be made from a suitable material like silastic or other rubber to allow the device to friction grip to the surface, such that the device does not tip over accidentally, as an example.

It should be noted that the top cover 202, the body housing 217 and the bottom base 235 may each be manufactured from any suitable plastic material like polypropylene (PP), as an example. The cover center lighting 201 may be made from any tough transparent material, such as transparent polycarbonates (PC), as an example, to allow the user to view the inside of the device from the top. The pushbutton 206 shown in FIGS. 2A-2B may be manufactured from any suitable plastic material, such as acrylonitrile butadiene styrene (ABS) or some other thermoplastic polymer, as an example. As an example, the control panel 213 may be manufactured from any suitable impact resistant material, such as translucent PC. As an example, the sanitizing device 200 may be designed such that the device may be sit on the surface without appearing too large to the user, at about 14 inches wide, 16 inches deep and 14 inches tall. Additionally, the sanitizing device may be manufactured to have a light enough weight to make the device easily transferrable from, for example, a shelf onto the countertop, at about 12 pounds. Each of the above-mentioned materials may be chosen to enable the electric sanitizing device to be more cost-effective, reducing manufacturing costs, as an advantage.

Figure 3:
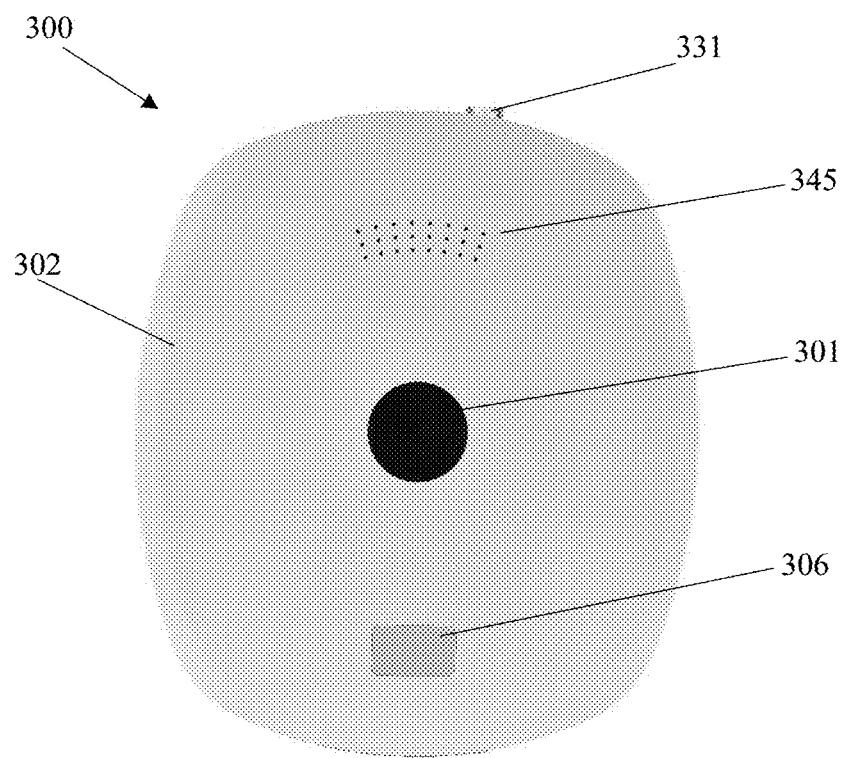
FIG. 3 illustrates a top view of an electric sanitizing device in a closed state, according to an aspect.

FIG. 3 illustrates a top view of an electric sanitizing device 300 in a closed state, according to an aspect. As shown in FIG. 3, the vent 345, center light 301 and pushbutton 306 are all visible in this view and form a part of the top cover 302, as an example. As an example, an easy disconnect-type hinge can be incorporated into the lid 302 having quick connects for electrical and spray water connections. As an example, the rear of the electric sanitizing device 300 may be provided with a connection terminal protruding outwardly from the rear. As an example, the connection terminal may transfer power to the electric sanitizing device 300 via a power chord connected to a power socket.

Figure 4A:
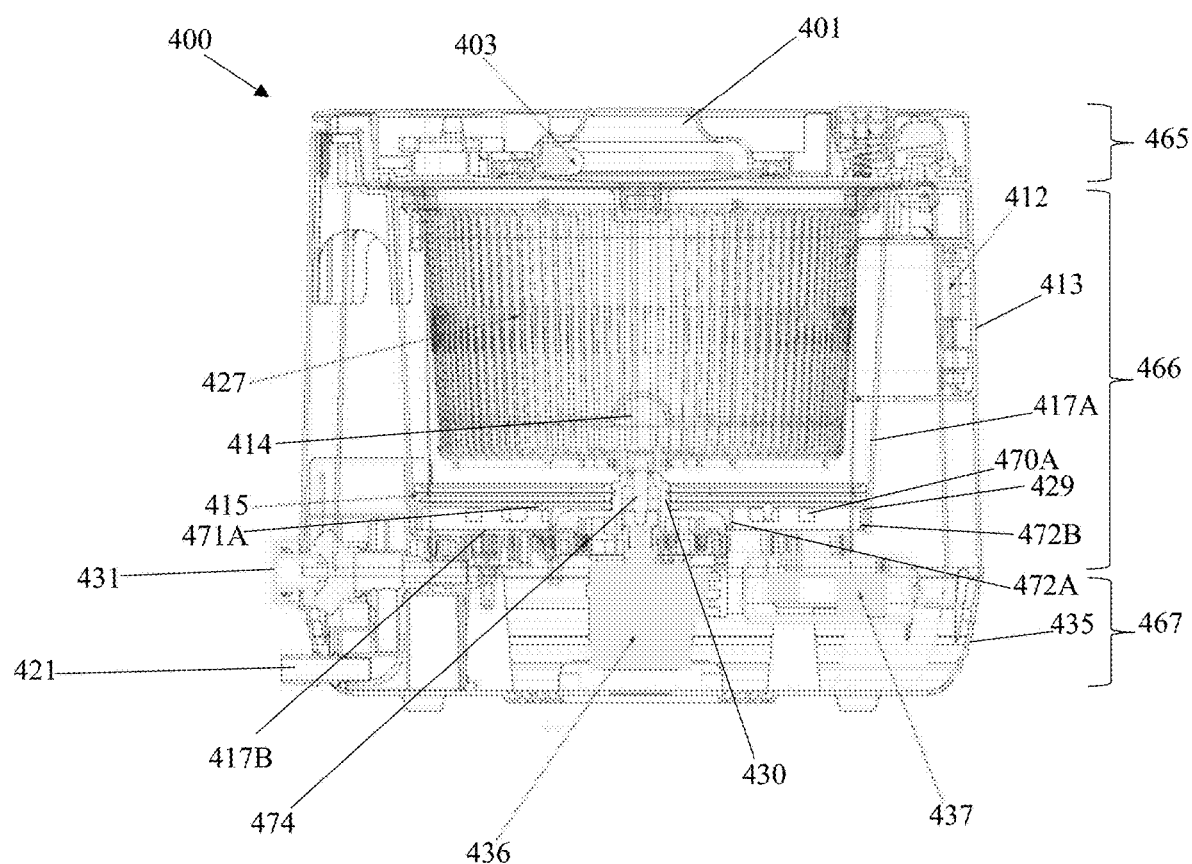
FIGS. 4A-4B illustrate right and left side sectional views, respectively, of an electric sanitizing device in a closed state, according to an aspect.
Figure 4B:
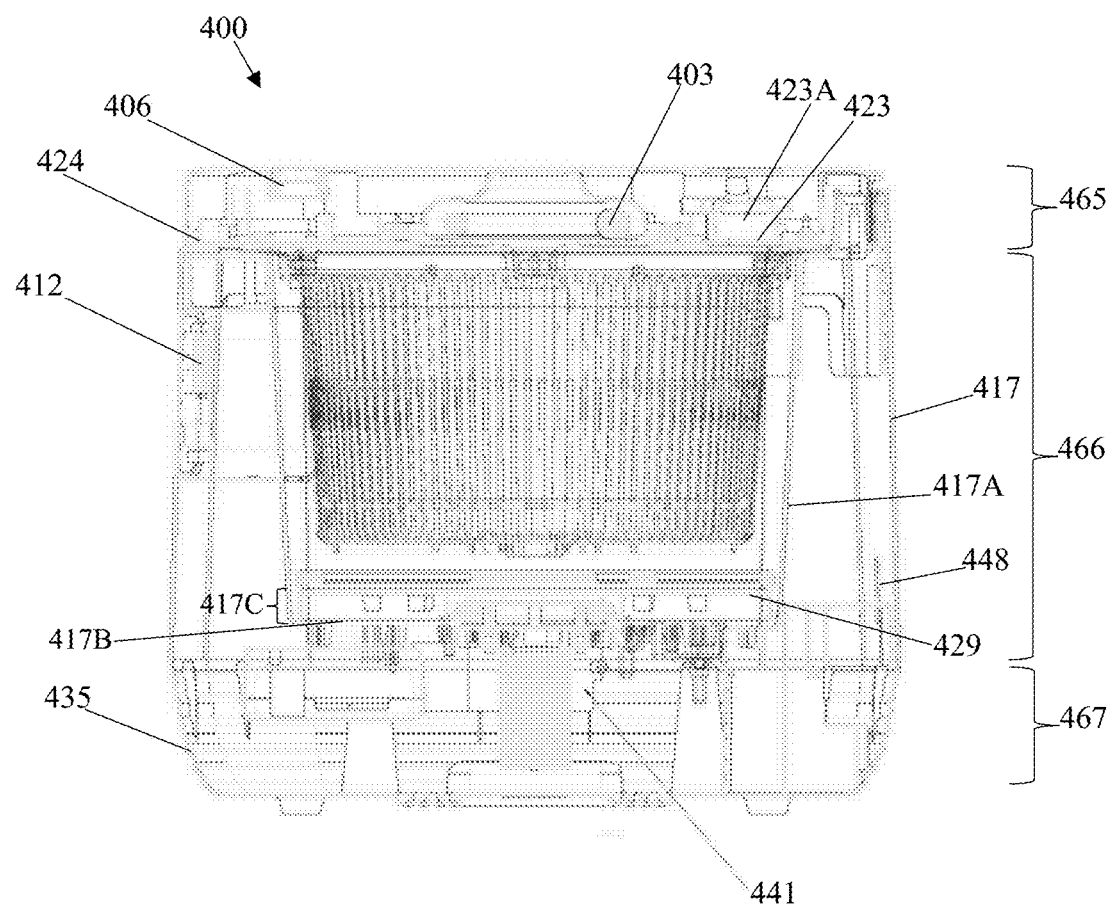

FIGS. 4A-4B illustrate right and left side sectional views, respectively, of an electric sanitizing device 400 in a closed state, according to an aspect. As mentioned previously throughout the disclosure above, the electric sanitizing device 400 may comprise three primary portions: a lid compartment 465, a treatment zone 466 and an electronic compartment 467. Each portion/compartment may comprise a plurality of exemplary components to allow the device to cleanse and purify food and consumer items of infectious bacteria and viruses. As shown in FIG. 4A, the electric sanitizing device 400 may be provided with a UV lamp ("UV lamp," "UVC lamp") 403 disposed within a bottom portion of the top center 401, as an example. The UV lamp may be adapted to have a circular or straight-line tubular design, as an example. As will be described in greater detail when referring to FIG. 5 below, the UV lamp 403 emits ultraviolet light rays into an interior space ("interior space," "interior cavity," "inner treatment zone," "cleaning chamber") 417A of the sanitizing device 400 to aid in the provided method of improving food and consumer item safety, as an example. As shown, the lid compartment 465 sits flush atop the body of the treatment zone 466, thus creating an airtight seal within the device. The cleaning chamber 417A may comprise a bottom floor 417B, as shown in FIG. 4A.

As shown, the electric sanitizing device 400 may also be provided with a display board ("display board," "display screen," "display") 412 forming a part of the control panel 413, shown previously in FIGS. 2A-2B, for example. As will be discussed in greater detail when referring to FIG. 11, the control panel 413 and the display 412 may enable the user to control and interact with the device 400. As shown in FIG. 4A, the interior 417A of the device 400 may be provided with a basket 427, which may comprise an isolation plate ("isolation plate," "ice cover") 414, as an example. Before operation of the device, a user may place food items (e.g., fresh produce), bottles, utensils, cellphones, etc. in the basket 427. As will be described in greater detail later in this disclosure, the basket 427 may rotate to aid in the provided method of food and household item purification. As shown in FIG. 4A, the interior 417A may also be provided with a filter plate 415, which may sit above a retention plate ("retention plate," "distribution plate," "pressure plate") 429, as an example. As shown as an example, the retention/distribution plate 429 may be provided with downward flow passages 470A and upward flow passages 471A, as well as a pair of inner and outer lips 472A, 472B, which will be described in detail when referring to FIG. 9. As shown in FIG. 4B, a bottom portion of the cleaning chamber 417A may form a contact tank ("contact tank," "water tank") 417C, which occupies the space between the bottom floor 417B and the retention/distribution plate 429, as an example.

As shown as an example, the electric sanitizing device 400 may further comprise a rotary motor 436 disposed below the treatment zone 417A. As shown in FIG. 4A, the rotary motor 436 may be provided with a central pin 474 that extends upwardly into the interior cavity 417A. An axle seat 430 may encase the central pin 474, such that the filter plate 415 and the drain board 429 are secured centrally atop the axle seat 430, as shown in FIG. 4A. As shown as an example, a distal end of the central pin 474 may attach centrally to the bottom of the basket 427, such that when the rotary motor 436 rotates the pin 474, the basket 427 may spin axially about the pin axis. Additionally, as shown in FIG. 4A, the electric sanitizing device 400 may be provided with a power board 437, which acts as the control board assembly for the various electrical components disposed in the base 435 of the device. As shown, the base 435 may also encase a rotary knob 431 and a nozzle 421 positioned below the knob 431, as an example. As shown, both the rotary knob 431 and the nozzle 421 may protrude outwardly from the rear of the electric device 400. As will be discussed in further detail later in this disclosure, the interior 417A may be filled with water before operation of the device 400 by a user. After completion of the cleaning process, the user may actuate the rotary knob 431 to release the dirtied water out of the nozzle 421. The nozzle 421 may be provided with a hose (not shown) to direct the dirtied water into a sink, as an example.

As an example, the electric sanitizing device 400 may be provided with a magnetic switch (not shown) installed between the lid compartment 465 and the body 466. The magnetic switch may operate as an auto shut-off feature for the device; the electrical circuit is broken when the contacts of the magnetic switch are separated (i.e., when the lid is open). As such, the sanitizing device 400 will not power on and/or operate when the lid 465 is open or not fully engaged with the body 466, as an example.

As shown in FIG. 4B, the bottom ("bottom," "base") 424 of the lid may be provided with a filter cover 423. The filter cover 423 may encase an activated carbon filter or replaceable carbon filter cartridge 423A and may reside within the vent (shown by 345 in FIG. 3). As will be described in further detail when referring to FIG. 5, oxygen and heat released during the cleaning process may pass out of the device through the activated carbon filter 423A and the vent. The electric sanitizing device 400 may further comprise a water level view 448 disposed in the body 417 of the device. As an example, the water level view 448 may indicate proper water fill levels inside the interior cavity 417A of the device. As shown in FIG. 4B, the electric sanitizing device 400 may also be provided with an ozone generator 441 within the base 435 of the device. As an example, the ozone generator may be positioned next to the controller power board 437 shown in FIG. 4A. As will be discussed in greater detail when referring to FIG. 6, the ozone generator 441 supplies the interior 417A with ozone during the cleaning process.

Figure 5:
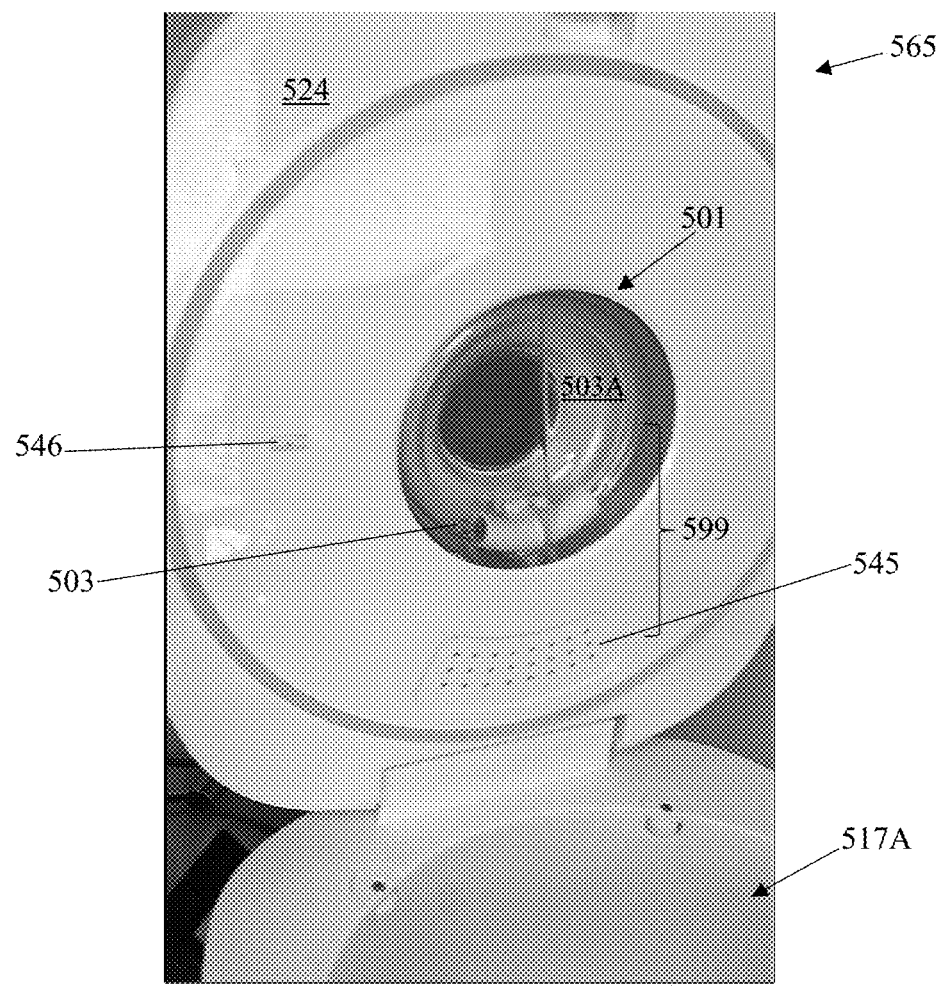
FIG. 5 illustrates a perspective view of the bottom base of the lid compartment 465 shown in FIGS. 4A-4B, according to an aspect.

FIG. 5 illustrates a perspective view of the bottom base 525 of the lid compartment 465 shown in FIGS. 4A-4B, according to an aspect. As discussed previously when referring to FIGS. 4A-4B, the electric sanitizing device may be provided with the UV lamp 503 in the bottom base 525 of the lid compartment 565. As previously described, the viewing port 501 may be made of a transparent material (e.g., transparent PC) to allow the user to look inside the device from the top during operation, without being exposed to UVC rays. As shown, the UV lamp 503 may be encased within a cavity formed by the viewing port 501 and a bottom light screen ("light screen," "light window," "glass window") 503A. As shown, the bottom light screen 503A may be transparent and may be manufactured of quartz glass, as an example, to allow ultraviolet rays to pass through the screen 503A. As an example, the UV lamp 503 may emit ultraviolet light rays at approximately 254 nm. As shown in FIG. 5, the bottom 525 of the lid 565 may also comprise the vent 545. As described above, the activated carbon filter (not shown) may be disposed within the vent 545. As shown, the UVC lamp 503 may be positioned in close proximity with the vent 545, the significance of which will be described in detail below. As an example, the distance 599 between a center of the UVC lamp compartment 503 and a center of the vent 545 may be about 2-4 inches. Lastly, as shown, the base 525 may further comprise a spray spout ("spray spout," "waterspout," "spray nozzle") 546, as an example. The spray spout 546 may eject water onto items placed within the sanitizing device during operation, the purpose of which will be described below.

The UV lamp 503 and the activated carbon filter (within the vent 545) form the two stages of a two-stage off-gas destruct system, according to an aspect of the present invention. The UVC lamp may produce an intensity of approximately 1200 micro watts per centimeter squared at about 3 (three) inches away from the quartz glass (501), which provides a protective covering for the UVC lamp 503, as an example. During the first stage of the two-stage off-gas destruct system, the UVC lamp 503 incorporated in the lid 565 creates hydroxyl radicals, which will be discussed in more detail when referring to FIG. 6 below.

Figure 6:
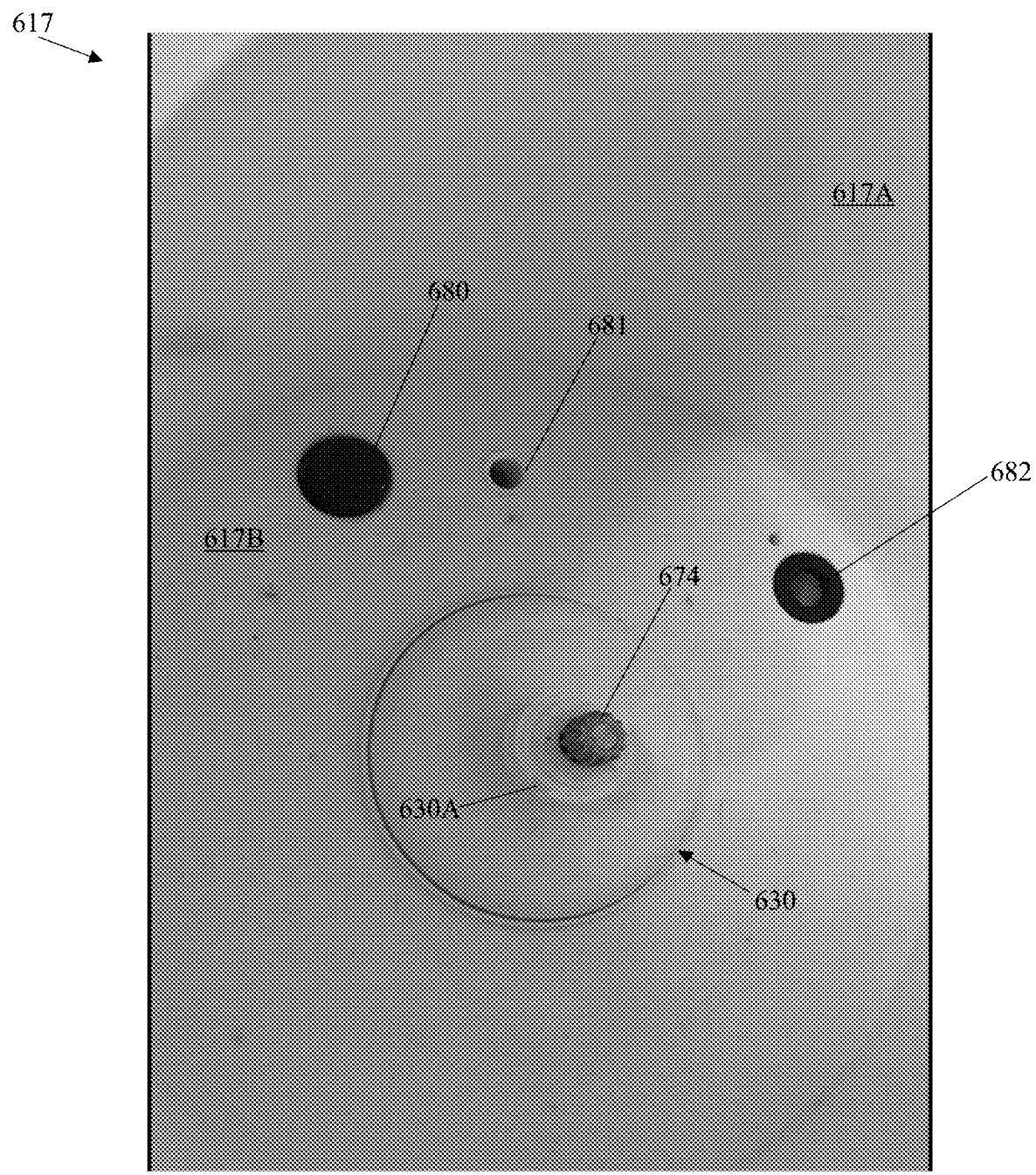
FIG. 6 illustrates a top perspective view of a bottom floor of the inner treatment zone of the electric sanitizing device body, according to an aspect.

FIG. 6 illustrates a top perspective view of a bottom floor 617B of the inner treatment zone 617A of the electric sanitizing device body 617, according to an aspect. As shown in FIG. 6, the bottom floor ("bottom floor," "bottom") 617B may be provided with a dispersion stone 680, a water drain hole 681 and a water inlet 682 having a particulate filter, as an example. It should be understood that the dispersion stone 680 is provided with a socket for mounting purposes, as shown. As described previously when referring to FIGS. 4A-4B, the electric sanitizing device may comprise the rotary motor, wherein the central pin 674 of the rotary motor extends into the internal space 617A. As shown, the axle seat 630 encapsulates the central pin 674 and encases the rotary motor. As will be discussed when referring to FIGS. 7-8, the axle seat 630 also provides an engagement means 630A for the filter plate (shown by 415 in FIG. 4A) and the retention/distribution plate (shown by 429 in FIG. 4A). The water drain hole 681 may be in fluid communication with the water level view (shown by 448 in FIG. 4B), as an example.

As mentioned previously above, the electric sanitizing device may comprise the ozone generator (shown by 441 in FIG. 4B), which supplies ozone to the internal cavity 617A through the dispersion stone 680. As an example, the dispersion stone 680 may be provided with a tube connected to the ozone generator. The ozone generator may be provided with a built-in air pump and delayed pump shut off, as an example. During operation, the built-in air pump may pump air at approximately 1-2 liters per minute (lpm) through the ozone generator, which may produce ozone at approximately 100 milligrams per hour (mg/hr). The ozone entrained air may then flow through the dispersion stone 680 into the contact tank (shown by 417C in FIG. 4) and up to the inner treatment zone 617A. As mentioned previously above, the contact tank may be filled with water, prior to operation of the device, of a volume of approximately 4 cups or 32-40 fluid ounces. The dispersion stone 680 may create micro bubbles in the water as the ozone exits micro-sized pores in the stone's surface. Thus, the amount of dissolved ozone in the water may approximately be 0.5 parts per million (ppm). Thus, an advantage is the reduction in water consumption due to the efficient use of only about 32 ounces of water per cleaning cycle.

The water inlet 682 may be connected to a water pump (shown by 1138 in FIG. 11), which supplies the ozonated water in the interior 617A to the spray nozzle (shown by 546 in FIG. 5) in the lid (shown by 565 in FIG. 5). The spray nozzle may then apply the ozonated water to the items placed in the basket (shown by 427 in FIG. 4A) at approximately 10 ounces per minute (oz/min), as an example. As will be discussed later when referring to FIG. 10, the basket may be attached centrally to the pin 674, which may rotate the basket at approximately 35 revolutions per minute (rpm) during cleaning. During the cleaning process, the ozone concentration in the treatment zone may thus exceed 20 ppm, as an example.

In an aspect of the current invention, the electric sanitizing device may be provided with methods of treating and purifying food items and various consumer products. According to the example above, during the first stage of the cleaning process ("cleaning process," "UV ozone process," "advanced oxidation process," "off-gas destruct process"), the treatment zone develops a pressure above atmosphere that is dependent on the rate of airflow produced by the air pump and the sizing and packing of the activated carbon filter (discussed when referring to FIG. 5) within the lid compartment. In the UV ozone process, as an example, photons in the UVC spectrum (~254 nm) sourced by the UVC lamp (shown by 503 in FIG. 5) convert ozone $O_3$ in the presence of water $H_2O$ to oxygen $O_2$ and hydrogen peroxide. The hydrogen peroxide $H_2O_2$ then reacts with the ozone $O_3$ to form the hydroxyl radical .OH (discussed when referring to FIG. 5). A simplified reaction sequence is shown below:

In the presence of UV light: $O_3 + H_2O \rightarrow O_2 + H_2O_2$, then $2O_3 + H_2O_2 \rightarrow 2.OH + 3O_2$ Approximately 20 to 30% of the ozone is converted to oxygen and hydrogen peroxide, as indicated above. The hydrogen peroxide then reacts with the ozone that has not converted to oxygen and hydrogen peroxide to form the hydroxyl radical. As indicated by the above reaction sequence, organic oxidation occurs due to the reaction with hydroxyl radicals, molecular ozone, and direct photolysis, as an example. The use of ozone and a light water spray or high humidity levels enhances the sanitation of products placed within the electric sanitizing device. The water film applied by the spray nozzle acts in the manner of an impedance transformer, whereby only a small amount of the ozone's molecular energy is required to pass through the bacterial membrane. As an example, the synergistic effect of UV and ozonated water treatment is due to the combination of ozonated water and ozone gas released from the ozonated water, which can access the inner portions of a food item (e.g., the inner folds of romaine lettuce), where UV light alone cannot reach. In addition, the UV light can stimulate the opening of the stomata of food items, for example, and allow ozonated water and/or ozone gas to inactivate bacteria that may be internalized in the stomata. Thus, an advantage is that the germicidal UV light reduces internalization of bacteria. Another advantage is that the electric sanitizing device may operate a chemical-free automated process, thus leaving behind no residual or harmful chemical byproducts.

An oxidizing agent, as is known in the art, is a substance that has the ability to oxidize other substances, such as in the exemplary reaction sequence above. The electron oxidizing potential (EOP) of the hydroxyl radical produced via the process above, compared with ozone and other oxidizing agents, can be found in Table 1 below.

TABLE 1

Potentials of various oxidizing agents

| Oxidizing Agent | EOP |
| --- | --- |
| Hydroxyl radical | 2.80 |
| Ozone | 2.08 |
| Peracetic acid | 1.81 |
| Hydrogen peroxide | 1.78 |
| Hypochlorite | 1.49 |
| Chlorine | 1.36 |
| Chlorine dioxide | 1.27 |

As an example, the potential of the hydroxyl radical is 0.72 higher than ozone, as shown above. Thus, the hydroxyl radical may be among the most powerful disinfectant agents. Thus, an advantage is the natural removal of germs and bacteria and the significant reduction in the presence of pesticides.

During operation of the second stage of the off-gas destruct system, the activated carbon filter converts any residual ozone to oxygen, maintaining ozone concentrations greater than 20 ppm in the interior 617A, as an example. The activated carbon may chemically react with the ozone to decompose or destruct it, as an example. The air pump within the ozone generator continues to pump air once the ozone generator stops generating ozone. As such, the ozone within the cavity 617A that has been converted to oxygen is pushed out through the vent in the lid. Thus, the UV light and the air pump operate for an additional time after the UV ozone process to purge residual ozone in the inner treatment zone 617A, causing the converted oxygen to be released through the vent and the activated carbon filter. Any residual harmful particles in the air exiting the device may also be trapped by the activated carbon filter, as an example. A portion of the heat generated from the UVC lamp may also be dissipated through the vent, which may be an additional purpose for positioning the UVC lamp and the vent in close proximity (as seen in FIG. 5, for example). Thus, an advantage is the improvement in safety for the user, since there may be virtually no ozone left in the device upon completion of the cleaning process.

Figure 7:
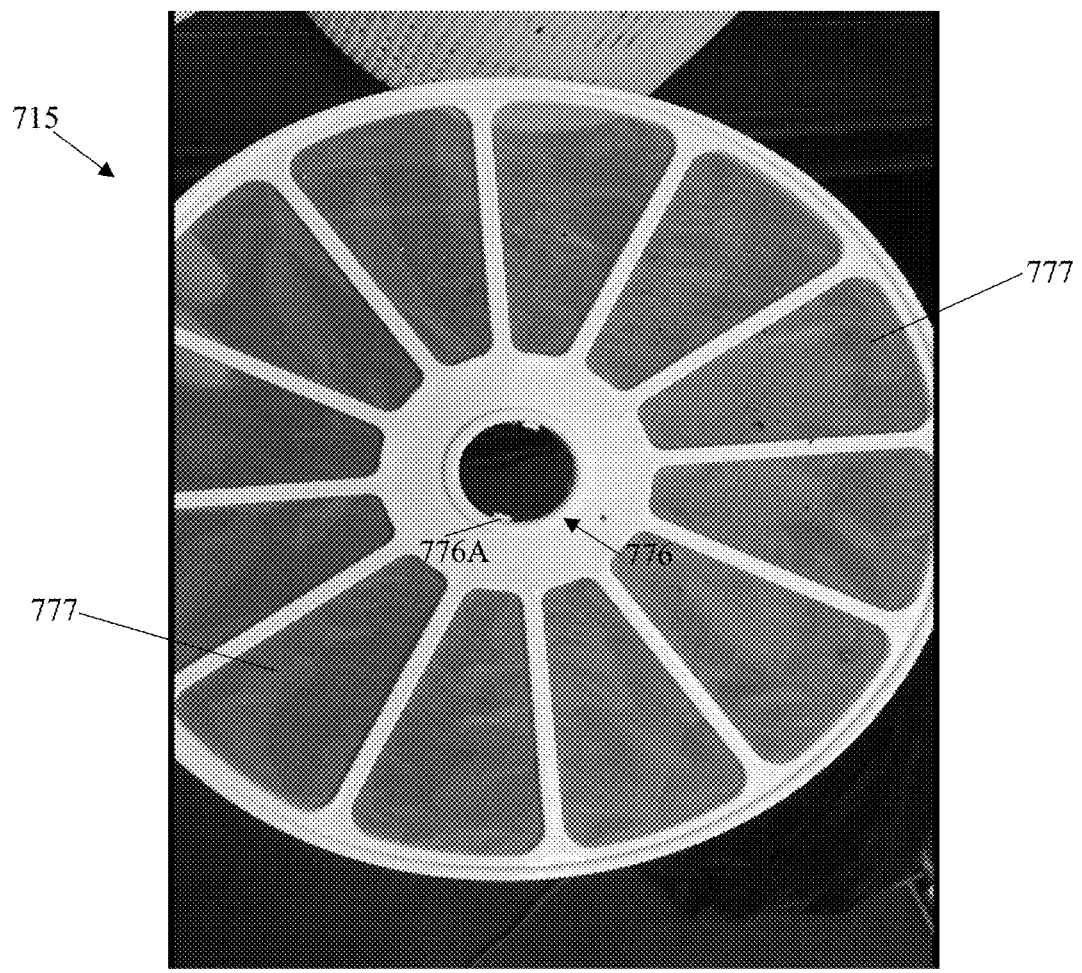
FIG. 7 illustrates a top view of the filter plate 415 shown in FIGS. 4A-4B, according to an aspect.

FIG. 7 illustrates a top view of the filter plate 415 shown in FIGS. 4A-4B, according to an aspect. As mentioned previously when referring to FIGS. 4A-4B, the electric sanitizing device may be provided with the filter plate 715 placed within the cleaning chamber (shown by 617A in FIG. 6). As was shown in FIG. 4A, the filter plate 715 may be placed atop the retention/distribution plate (429). As shown in FIG. 7, the filter plate 715 may comprise a circular shape to coincide with the shape of the cleaning chamber, as an example. As shown, the filter plate 715 may be provided with a plurality of screens 777 arranged in a circular pattern around a central portal 776. As described previously above, the filter plate 715 may be secured to the axle seat (630) shown in FIG. 6 via the tabs 776A disposed in the central portal 776, as shown as an example.

As an example, the filter plate 715 may function as a filter or net to trap any debris or particulates that may be residing on food and/or household items being placed in the cleaning chamber. Before operation, as the water is poured into the cleaning chamber and over the items to be cleaned (e.g., vegetables), the debris or particulates may be caught by the plurality of screens 777, as an example. Furthermore, during operation, while the spray nozzle is on and spraying ozonated water onto the items, debris or particulates removed via the basket rotation may also be caught by the plurality of screens 777. Due to the compact nature of the device and the easily removeable nature of each component in the interior cavity (e.g., filter plate, basket, distribution/retention plate), a user may clean away any caught debris on the filter plate 715 after the cleaning process has completed, as an example.

Figure 8:
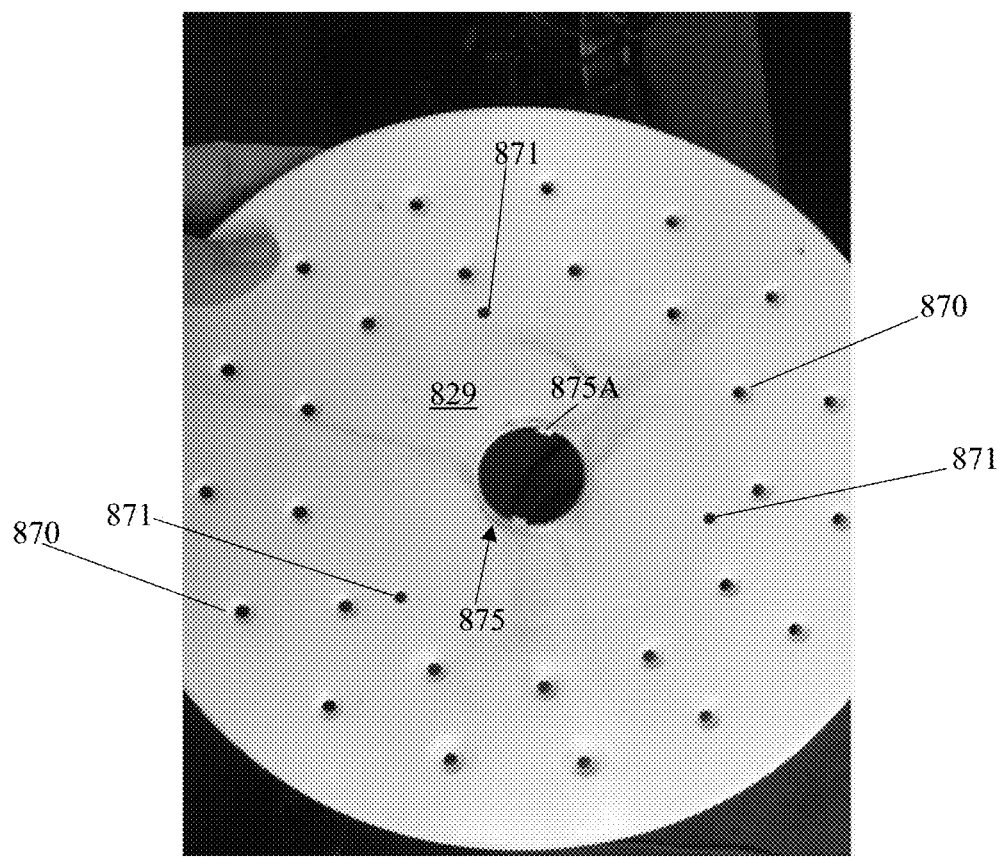
FIG. 8 illustrates a top view of the retention/distribution plate 429 shown in FIGS. 4A-4B, according to an aspect.

FIG. 8 illustrates a top view of the retention/distribution plate 429 shown in FIGS. 4A-4B, according to an aspect. As mentioned previously when referring to FIGS. 4A-4B, the retention/distribution plate 829 may sit below the filter plate within the cleaning chamber, as an example. As shown in FIG. 8, the drain board or retention plate 829 may comprise a plurality of hole openings disposed in a circular arrangement throughout the surface of the plate 829. As shown, the plurality of hole openings may be divided into ozone holes 871 and water holes 870. As an example, the retention plate 829 may be provided with three ozone holes 871, which may each comprise a diameter that is smaller than a diameter of each of the surrounding water holes 870, as shown. As shown, the retention plate 829 may also comprise a center hole 875 having tabs 875A for securing the plate 829 onto the axle seat, which will be discussed later when referring to FIG. 9.

As an example, the diameters of the ozone holes 871 and the water holes 870 may be particularly calculated, such that the diameters and the number of each hole 870, 871 ensures a particular ratio of ozone to water inside the cleaning chamber. As an example, each of the ozone 871 and water holes 870 may comprise a flow passage (shown by 470A, 471A in FIG. 4A), such that when water is applied into the device, the water may flow over the contents of the basket, onto the filter plate, into the hole openings 871, 870, through the downward flow passages and into the contact tank in a controlled manner.

Figure 9:
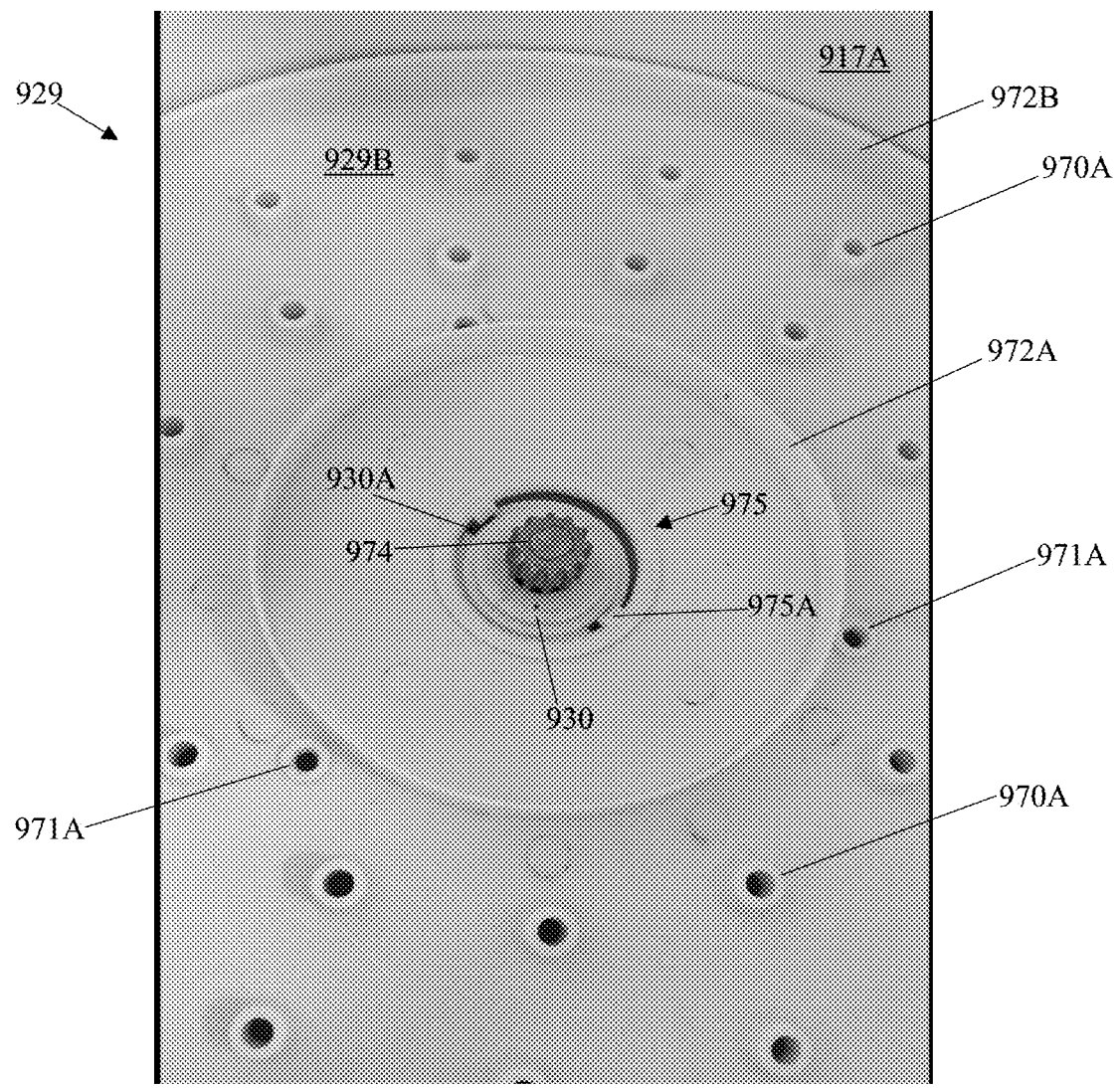
FIG. 9 illustrates a top perspective view of a bottom of the retention/distribution plate 729 shown in FIG. 7, sitting inside the electric sanitizing device, according to an aspect.

FIG. 9 illustrates a top perspective view of a bottom 929B of the retention/distribution plate 729 shown in FIG. 7, sitting inside the electric sanitizing device, according to an aspect. As described previously above, the retention plate 929 may be placed within the cleaning chamber 917A and secured to the axle seat 930, as an example. As shown, the tabs 975A of the center hole 975 may fit into the notches 930A of the axle seat 930 to maintain the retention/distribution plate 929 within the chamber 917A. As an example, the axle seat 930 may be threaded, such that when the tabs 975A are inserted into the notches 930A and rotated along the threads of the axle seat 930, the retention/distribution plate 929 may be securely fixed to the axle seat 930. It should be understood that the filter plate (shown by 715 in FIG. 7) sits atop the retention/distribution plate 929 and may be secured to the axle seat 930 in the same manner (via tabs 776A).

As mentioned previously above, the bottom 929B may also be provided with a pair of lips 972A, 972B each extending upwardly and forming a circular shape in the bottom of the plate 929B. As shown, a first lip 972A may be provided around the center 975 of the plate 929 and a second lip 972B may be provided around the edges of the plate. As an example, the lips 972 may be about ½ inches in height from the bottom 929B. As an example, the lips 972 may support the bottom of the plate 929 when the plate sits atop the bottom floor of the cleaning chamber. Additionally, the outer lip 972B may form a friction seal with the walls of the interior cavity 917A. As shown previously in FIGS. 4A-4B, the interior cavity may be conically shaped, thus forming the friction seal with the outer lip 972B, which forces water to travel only through the downward flow passages 970a, which will be discussed below. It should be understood that the lips need not be flush with the bottom floor of the cleaning chamber, so long as the lips form a friction seal with the walls of the cleaning chamber.

It should be understood that FIG. 9 illustrates the bottom of the retention plate 929, which faces downwardly, when the retention plate is properly attached to the axle seat 930. Additionally, as mentioned throughout this disclosure, when the retention plate 929 is secured to the axle seat 930 and forms a friction seal with the cleaning chamber walls 917A, the space between the bottom floor of the cleaning chamber and the plate 929 forms the contact tank. When the water is initially poured into the cleaning chamber, the water flows downward and situates within the contact tank at the bottom portion of the cleaning chamber, as an example.

As described previously above, each ozone and water hole of the drain board may be provided with a flow passage. As shown in FIG. 9, the downward flow passages 970A of the water holes and the upward flow passages 971A of the ozone holes may extend upwardly from the bottom 929B. The downward flow passages 970A may help direct water flowing from the basket through the filter plate, and downward to the contact tank below the retention plate 929, as an example. The upward flow passages 971A may direct off-gassing of any excess ozone dissolved in the water. As mentioned previously above, the ozone and water holes may have a specific diameter to help maintain 0.5 ppm of dissolved ozone in the water. The downward flow passages may be maintained in a flooded condition, such that water poured into the device flows down to the contact tank as quickly as possible. The flow rate of the water (e.g., 10 oz/min) may determine the size and number of downward flow passages 970A. The downward flow passages thus help evenly mix the ozone gas and the water. The size and number of upward flow passages 971A may be determined by the volume of off gassing from the water in the contact tank (e.g., 20 ppm).

As an example, the lips 972 and the downward flow passages 970A may be different heights so that when the plate rests at the bottom of the cleaning chamber, the water flowing downward from the top of the chamber may fill the contact tank. As an example, the downward flow passages 970A may be about ⅛ inches shorter than the lips 972. Due to the particular configuration of the flow passages, ozone off-gassing may escape only through the upward flow passages 971A. As an example, when the contact tank is filled with water, a difference in pressure exists between the contact areas of the downward flow passages and the upward flow passages. The downward flow passages 970A extend deeper into the water when the contact tank is full, and the ozone gas therefore experiences greater pressure at those points (i.e., due to the water depth). The upward flow passages 971A are much shorter in length, and thus less pressure is exhibited at those contact points. Thus, the ozone gas may take the path of least resistance and the ozone off-gassing occurs at the upward flow passages 971A. As the excess ozone gas rises upwardly through the cleaning chamber, the ozone gas may further facilitate cleaning of the item before being purged by the two-stage off-gas destruct system, as an example.

It should be noted that although a plurality of downward flow passages is illustrated, the retention/distribution plate may be adapted to have more passages, or as few as one. The length of the passage(s) and the size of the corresponding hole(s) need only be recalculated to ensure the preferable ratio of ozone to water in the contact tank after mixing.

Figure 10:
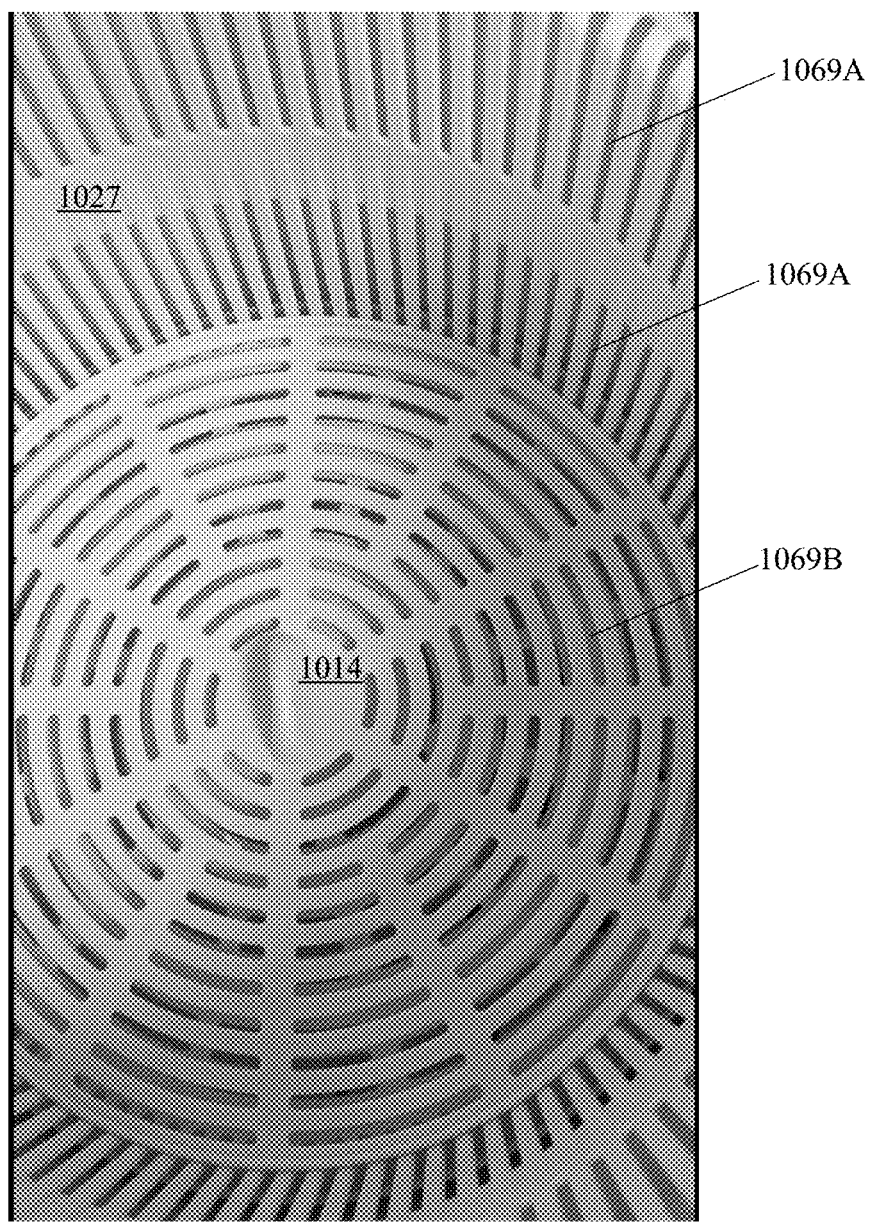
FIG. 10 illustrates a top view of the basket 427 shown in FIGS. 4A-4B, according to an aspect.

FIG. 10 illustrates a top view of the basket 427 shown in FIGS. 4A-4B, according to an aspect. As described previously throughout this disclosure, the basket 1027 may be placed within the cleaning chamber and may hold the various items to be sanitized, as an example. As mentioned above, the basket 1027 may be fixed to the central pin of the rotating motor and may sit atop the filter plate, as an example. It should be understood that the rotating motor may rotate the basket while the filter plate and the retention/distribution plate remain stationary inside the cleaning chamber.

As shown as an example, the basket 1027 may also be provided with an ice cover 1014 at the inside base of the basket 1027 for filling the treatment chamber with ice. As an example, a user may remove the ice cover 1014, place ice at the inside base of the basket 1027 and then place the ice cover 1014 over the ice. The food or household items to be cleaned may then be placed on top of the ice cover 1014 as an example. The ice may be used with the electric sanitizing device as an alternative for filling the contact tank with water, as an example. It may be preferable for the user to use ice rather than water for improved cleaning within the device. The ice may be melted by the UVC lamp and the melted ice may then flow down to the contact tank, as an example. However, it should be understood that it is possible for both ice and water to be used with the device for the sanitization of food products and non-electronic consumer items.

As shown in FIG. 10, the basket 1027 and the ice cover 1014 may comprise a plurality of vertical slits 1069A and horizontal slits 1069B across the entire surface of the basket 1027 and the ice cover 1014. As an example, the number of slits 1069A, 1069B and the spacing between each slit 1069A, 1069B is designed to maximize the turbulence that the contents of the basket are exposed to. As has been described throughout this disclosure, the basket may be rotated or spun by the rotating motor at approximately 35 rpm. Rotating of the basket 1027 exposes the contents to a gentle spray of ozone entrained water and germicidal UV light and vapor that may cover the entire surface of each of the contents in the basket. As an example, spinning the basket 1027 may ensure that the water may seep into all the nooks and crevices of nonuniformly shaped produce, such as raspberries and romaine lettuce. The water may then simply drain away from the contents after application due to the centripetal force applied by the rotating motor, carrying away any debris with it. Thus, an advantage is that the produce shelf life of fresh foods may be extended.

As an example, the basket 1027 may be provided with additional racks (not shown) for stacking multiple produce for cleaning. In addition, portions of or the entirety of the basket 1027, as well as the racks, may be coated with a mirror finish or gloss to provide the surfaces of the basket and the racks with a reflectance greater than 60%, as an example, to provide a more even UVC coverage inside the cleaning chamber. As an example, the cleaning chamber and the basket may also be coated with titanium dioxide that forms additional hydroxyl radicals when exposed to UV light energy. As another example, the basket 1027 may be manufactured from PP and may be about 10 inches wide and about 6 inches deep, such that the basket support 8 liters. As another example, the basket may be provided with a disposable cupping filter or pouch (not shown) for the sanitizing of small grains that may easily fall between the slits of the basket.

As an example, the electric sanitizing device may be provided with stabilization rollers (not shown) mounted in the housing around the basket 1027. The stabilization rollers may allow the basket to freely spin within the cleaning chamber with minimal friction, as an example.

Figure 11:
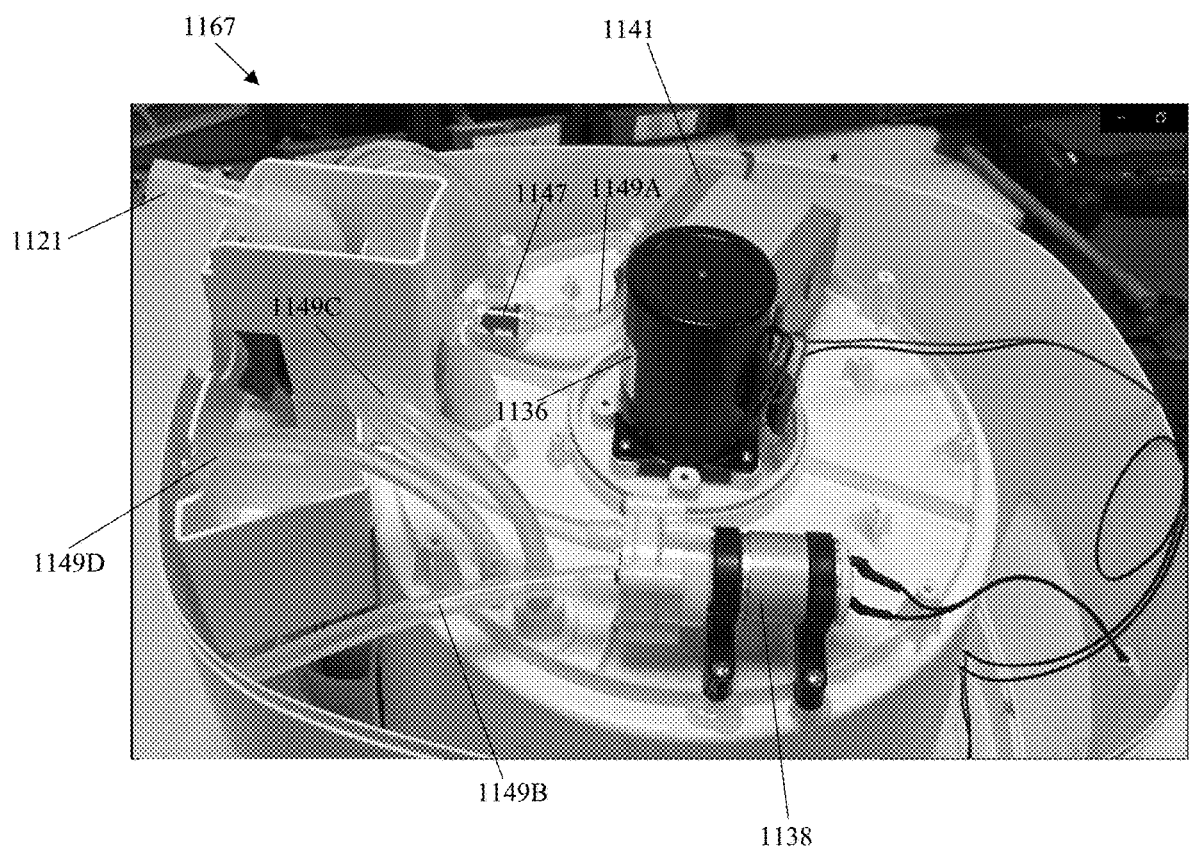
FIG. 11 illustrates a bottom perspective view of the electronic compartment housing an ozone generator, a rotary motor, and a water pump, according to an aspect.

FIG. 11 illustrates a bottom perspective view of the electronic compartment 1167 housing an ozone generator 1141, a rotating motor 1136, and a water pump 1138, according to an aspect. As previously described throughout this disclosure, the ozone generator 1141 may pump ozone into the contact tank of the treatment chamber, the water pump 1138 may pump ozonated water from the contact tank up to the spray nozzle, and the rotary motor 1136 may rotate the basket to treat products in the basket with ozonated water. As an example, the ozone generator may be a corona discharge type ozone generator. As shown in FIG. 11, the electronic compartment may comprise a plurality of tubes that connect to each of the major electronic pump components. As indicated by FIG. 11, the electrical components are completely separated from any water and/or moisture present in the treatment chamber to meet UL (Underwriters Laboratories) safety requirements. Thus, an advantage is the improved electrical safety for the user during operation of the device. Each of the above-mentioned electronic components in the electronic compartment may be electrically connected to, and controlled by, a controller mounted on the power board (shown by 437 in FIG. 4A).

As described above, each of the major electrical pump components in the electronic compartment 1167 may be provided with a tube that is in fluid communication with other parts of the sanitizing device, as an example. As shown in FIG. 11, the ozone generator 1141 may be provided with a first tube 1149A that extends into the contact tank. The air pump built into the ozone generator 1141 may pump ozone into the contact tank through the dispersion stone (shown by 680 in FIG. 6) via the first tube 1149A. As shown, the first tube 1149A may be provided with a valve 1147 to prevent any back flow of water from reaching and potentially destroying the ozone generator, as an example. As shown, the water pump 1138 may be provided with a second tube 1149B that extends up into the lid compartment and connects to the spray nozzle. The water pump 1138 may also be provided with a third tube 1149C that extends into the contact tank, as an example. Water in the contact tank that has been treated with ozone may be sucked into the water inlet (shown by 682 in FIG. 6) and through the third tube 1149C by the water pump 1138. The water pump 1138 may then pump the ozonated water up to the spray nozzle through the second tube 1149B, as an example.

As shown in FIG. 11, a fourth tube 1149D may also be provided in the electronic compartment 1167. The fourth tube 1146D may extend between the water drain hole (shown by 681 in FIG. 6) and the water level view (shown by 448 in FIG. 4). As an example, the fourth tube 1146D may fill with water originating from the contact tank to indicate to the user the proper filling level (via the water level view). Finally, as shown previously in FIG. 4, the electronic compartment 1167 may be provided with the drain nozzle 1121, as shown. As described previously when referring to FIG. 4, the user may engage the rotary knob (not shown) to empty out the dirtied water of the contact tank through the drain nozzle 1121.

Figure 12:
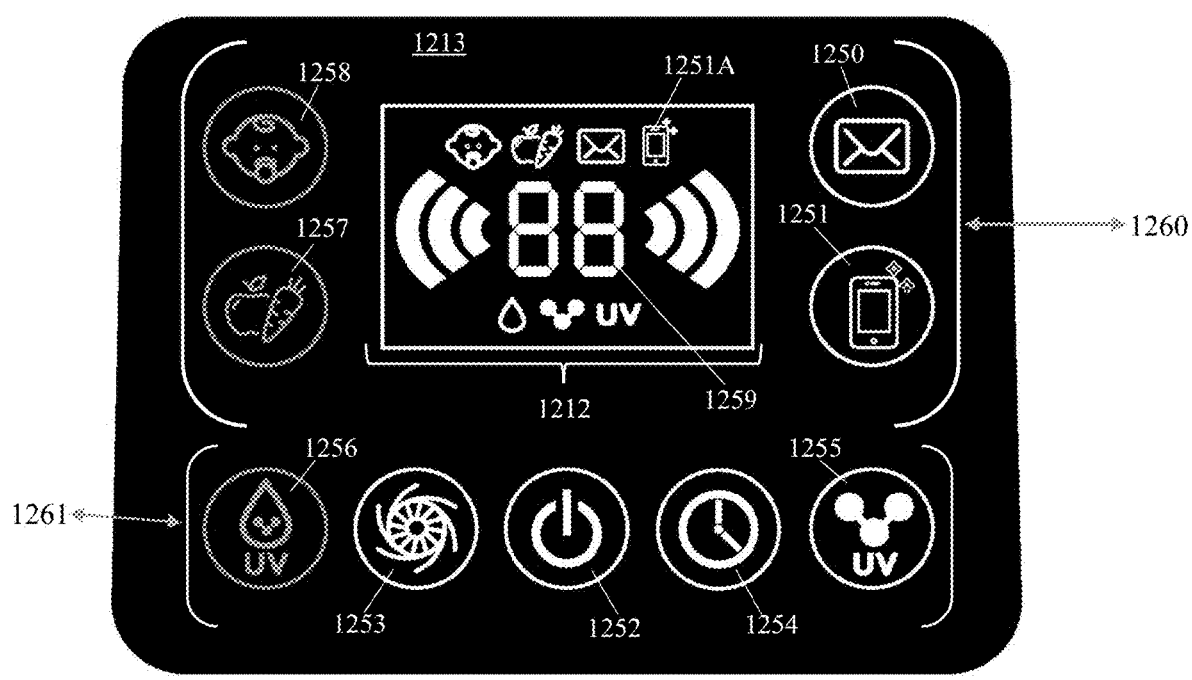
FIG. 12 illustrates a front view of the control panel 213 shown in FIGS. 2A-2B, according to an aspect.

FIG. 12 illustrates a front view of the control panel 213 shown in FIGS. 2A-2B, according to an aspect. As described previously when referring to FIGS. 2A-2B, the electric sanitizing device may be provided with the control panel 1213 for operation of the device by the user, as an example. As shown in FIG. 12, the control panel 1213 may comprise a display screen 1212 and a plurality of surrounding buttons for controlling the various settings of the device, as an example.

As an example, the electric sanitizing device may operate in automatic mode or in manual mode, depending on the preference of the user. As shown in FIG. 12, the auto modes of the sanitizing device may be set by the buttons indicated by the brackets at 1260, and the manual modes may be set by the buttons indicated by 1261. As will be discussed in detail hereinafter, the auto mode buttons 1260 and the manual mode buttons 1261 may enable a user to operate the electric sanitizing device to treat and purify food items and various household items that could potentially be carrying harmful bacteria or viruses. As shown as an example, the auto mode buttons 1260 may comprise four buttons for cleansing baby bottles and toys (indicated by 1258), fruits and vegetables (indicated by 1257), daily necessities (indicated by 1250), and electronics (indicated by 1251). As shown, each button 1250, 1251, 1257, 1258 may contain an illustration to indicate to the user the appropriate button to press for washing of a particular item (e.g., button 1250 to clean mail). Thus, an advantage is that the sanitizing device may offer the user a straightforward, intuitive interface for automatically operating the device.

It should be understood that although each button may be provided with a particular illustration, the electric sanitizing device may clean more than just the illustrated item. As an example, the user may clean numerous plastic articles using the mode set by the baby button 1258. Additionally, as an example, each button may be colored or the control panel may be color-coded to indicate, for example, dry cleaning versus wet cleaning. The baby button 1258, the fruits and vegetables button 1257 may be blue, for example, to indicate the use of water. The color coding may thus help reduce occurrences of accidental wet cleaning of electronic devices, for example, which could destroy the device.

As mentioned above, the electric sanitizing device may also operate in manual mode, as an example, indicated by the manual mode buttons at 1261. The manual functions are designed to be used independently or in combination for a variety of items. As shown as an example, the manual functions 1261 may comprise four buttons: washing sanitization 1256, dry sanitization 1255, basket spin on/off 1253, and timer button 1254. As shown, each button 1253-1256 may contain an illustration to indicate to the user the appropriate button to press for performing a washing of a particular function (e.g., button 1253 to rotate the basket). The washing sanitization button 1256 may also be colored blue to indicate to the user that the mode uses water, as an example. Thus, an advantage is that the sanitizing device may offer the user a straightforward, intuitive interface for manually operating the device.

In accordance with an aspect of the current invention, methods of automatically operating the electric sanitizing device may be provided for treating and purifying food items and various household products. The methods may be adapted for wet cleaning or dry cleaning the food and household items. As an example, a method of cleaning plastic articles like baby bottles and toys is provided. First, the user may rinse an item (e.g., baby bottle) under tap water before loading the item into the electric sanitizing device. For best results, the baby bottle should be placed on its side with the open end of the bottle pointed outwardly to prevent water from accumulating in the bottle, as an example. Then, the user may load the basket inside the sanitizing device with the item/items spaciously arranged (if more than one item). The user may then add about 3 cups of potable water into the device (anywhere in the cleaning chamber) and close the lid firmly, such that the lid is locked into the body. Then, the user may press the power button 1252 to turn on the electric sanitizing device and may push the baby button 1258 to begin the cleaning process.

During the cleaning process actuated by the baby button 1258, the air pump, water spray pump and ozone generator operate for about 4 minutes (according to the method outlined when referring to FIG. 6), with the basket rotating, and the UV lamp emitting UV light, simultaneously to uniformly wash the item. After the 4 minutes, the water pump and the ozone generator are closed. The UV lamp and the air pump continue to operate, and the basket continues to rotate, for about 5 minutes. After the 5 minutes, the UV lamp, the air pump and the basket rotating motor are turned off and the electric sanitizing device emits an audible sound to signal to the user that cleaning is complete. The device then completely shuts down and the user may open the lid to remove the now cleansed item from the basket.

It should be understood that the preceding operations, as well as each of the operations to follow, of controlling the various electronic components may be performed by a microcontroller or microprocessor housed in the electronic compartment (e.g., as a part of the controller on the power board 437). The microcontroller or microprocessor may be programmed to respond to commands entered via the control panel (via the buttons).

As another example, a method of cleaning fresh produce like fruits and vegetables is provided. First, the user may rinse a food item (e.g., fruit) under tap water before loading the item into the electric sanitizing device. Then, the user may load the basket inside the sanitizing device with the food item/items spaciously arranged (if more than one food item). The user may then add about 4 cups or 32 fl. oz of potable water into the device (over the items in the basket) and close the lid firmly, such that the lid is locked into the body. Then, the user may press the power button 1252 to turn on the electric sanitizing device and may push the fruit/vegetable button 1257 to begin the cleaning process.

During the cleaning process actuated by the fruit/vegetable button 1257, the air pump, water spray pump and ozone generator operate for about 4 minutes (according to the method outlined when referring to FIG. 6), with the basket rotating, and the UV lamp emitting UV light, simultaneously to uniformly wash the item. After the 4 minutes, the water pump and the ozone generator are closed. The UV lamp and the air pump continue to operate, and the basket continues to rotate, for about 5 minutes. After the 5 minutes, the UV lamp, the air pump and the basket rotating motor are turned off and the electric sanitizing device emits an audible sound to signal to the user that cleaning is complete. The device then completely shuts down and the user may open the lid to remove the now cleansed food item from the basket.

It should be understood that for each of the methods described above, the water poured into the electric sanitizing device may be reused for additional cleaning sessions of a similar item. As an example, the water used during the cleaning of a batch of apples could be used immediately after to wash a head of lettuce. As such, the water may be reused several times for the same product group. Thus, an advantage is the reduction of water used.

In another exemplary embodiment of the provided method, a method of cleaning daily necessities like mail and car keys is provided. First, the user may load the basket inside the sanitizing device with the mail spaciously arranged (if more than piece of mail). The user may then close the lid firmly, such that the lid is locked into the body. Then, the user may press the power button 1252 to turn on the electric sanitizing device and may push the daily necessities button 1250 to begin the dry-cleaning process.

During the dry-cleaning process actuated by the daily necessities button 1250, the air pump and the ozone generator operate for about 5 minutes, with the basket rotating, and the UV lamp emitting UV light, simultaneously to uniformly disinfect the dry good. After the 5 minutes, the ozone generator is closed. The UV lamp continues to operate, and the basket continues to rotate, for about 5 minutes. After the second 5 minutes, the UV lamp, the air pump and the basket rotating motor are turned off and the electric sanitizing device emits an audible sound to signal to the user that cleaning is complete. The device then completely shuts down and the user may open the lid to remove the now disinfected mail from the basket, for example.

Although no water was used in the previously described method of dry cleaning, it should be noted that ozone may still be used, even without the presence of water in the cleaning chamber. As an example, during dry cleaning, with ozone traveling throughout the cleaning chamber, the air pump naturally brings moisture into the cleaning chamber, such that a high humidity level is created. The humidity allows for the UV+ozone+water synergy that produces the strong hydroxyl radical described herein previously. It should also be understood that numerous other household items (e.g., bottles, utensils, gloves, cloth facemasks), not solely handheld electronic devices, can be sterilized via the dry-cleaning process.

In another exemplary embodiment of the provided method, a method of cleaning electronics like cellphones is provided. First, the user may load the basket inside the sanitizing device with a handheld electronic device (e.g., cellphone), such that the electronic device/devices is/are spaciously arranged (if more than one device). The user may then close the lid of the electric sanitizing device firmly, such that the lid is locked into the body. Then, the user may press the power button 1252 to turn on the electric sanitizing device and may push the electronics button 1251 to begin the dry-cleaning process.

During the dry-cleaning process actuated by the electronics button 1251, the UVC lamp operates for about 7 minutes, with the basket rotating simultaneously to uniformly sterilize the electronic device. After the 7 minutes, the UV lamp and the basket rotating motor are turned off and the electric sanitizing device emits an audible sound to signal to the user that sterilizing is complete. The device then completely shuts down and the user may open the lid to remove the now sterilized handheld electronic device from the basket.

In accordance with an aspect of the current invention, methods of manually operating the electric sanitizing device may be provided for treating and purifying food items and various household products. The methods may be adapted for wet cleaning or dry cleaning the food and household items. Operating the electric sanitizing device via the manual modes 1261 may enable a user to individualize and personalize the cleaning process according to the user's preferences. As an example, some manual modes require about 3 cups of potable water to be in the basket for operation. In an exemplary embodiment of the provided method, the user may place the desired item into the basket of the cleaning chamber and close the lid firmly to lock it in place. The user may then press the power button 1252 and select the desired manual mode(s) 1261.

As an example, the washing sanitization mode, actuated by button 1256, utilizes oxygen molecules pumped by the ozone generator, UVC light, basket rotation and potable water to help clean raw foods (e.g., fruits and vegetables). The washing sanitization mode may operate for a default time of 6 minutes. The user may press the timer button 1254 to increase the length of operation up to 30 minutes, as an example. During the washing sanitization function of the device, the water pump, the air pump, the ozone generator, the UV lamp and the rotary motor operate. Let total time be the amount of time set by the user (e.g., 6 minutes+amount of time extended via the timer button 1254); if the operation time is not extended, total time=6 minutes (default). After the washing sanitization operation runs for (total time−5 minutes), the ozone generator is closed. After another 5 minutes, the spray pump, the air pump, the UV lamp and the rotating motor are turned off. The electric sanitizing device then emits an audible sound indicating that sanitization is complete, and the device will completely shut down.

As another example, the dry sanitization mode, actuated by button 1255, solely utilizes the air pump, the ozone generator, basket rotation and the UVC lamp. This mode may be desirable when dry-cleaning, such as for disinfecting mail or car keys. The dry sanitization mode may operate for a default time of 6 minutes and can be extended up to 30 minutes by pressing the timer button 1254. It should be understood that the dry sanitization mode cannot work with the wet sanitization mode. During the dry sanitization function of the device, the air pump, the ozone generator, the UV lamp and the rotary motor operate. Let total time be the amount of time set by the user (e.g., 6 minutes+amount of time extended via the timer button 1254); if the operation time is not extended, total time=6 minutes (default). After the dry sanitization operation runs for [(total time−5 minutes)/2], the ozone generator is closed. After another 5 minutes, the air pump, the UV lamp and the rotating motor are turned off. The electric sanitizing device then emits an audible sound indicating that sanitization is complete, and the device will completely shut down.

As another example of manual operation, the basket spin on/off function, actuated by button 1253, turns on/off the basket rotation function. As an example, the basket spin on/off function may be paired with either of the preceding manual modes. Although both sanitization modes automatically turn on the basket spin function, the user may desire for the basket spin function to be turned off, as an example. As such, the user may press the basket spin button 1253 to stop the rotation of the basket during the sanitization operation.

Additionally, the basket spin on/off function may be used separately for spin drying dishes or disinfecting electronics, as an example. If the basket spin on/off function runs separately, the operation runs for a default time of 3 minutes but can be extended up to 30 minutes via the timer button 1254. The basket mode will run the air pump, the UV lamp and the rotary motor to spin the basket for the desired amount of time. After the operation completes, the air pump, the UV lamp and the rotating motor are turned off. The electric sanitizing device then emits an audible sound indicating that sanitization is complete, and the device will completely shut down.

As previously discussed, the timer button 1254 powers each of the manual operations up to 30 minutes. As previously mentioned, the user may select the desired manual function (e.g., washing sanitization 1256) and may press the timer button 1254 to increase the duration of the function continuously up to 30 minutes maximum. During countdown, the timer button 1254 may also be pressed to increase the time. As an example, if the amount of time of an operation is set less than 10 minutes, engagement of the timer button 1254 will extend the time in 2-minute intervals. If the set amount of time is between 10 minutes and 30 minutes (e.g., 15 minutes), engagement of the timer button 1254 will extend the time in 5-minute intervals up to 30 minutes total maximum. As an example, if the timer is set at 26/27/28/29 minutes, engagement of the timer button 1254 will extend the operation time to 30 minutes. The timer button cannot operate separately from the other manual functions.

As an example, the electric sanitizing device may be provided with a room-wide sterilization operation. The room-wide sterilization operation utilizes oxygen molecules and UV light originating from the sanitizing device to disinfect a room. As an example, the room-wide sterilization operation may eliminate bacteria, viruses, molds, smoke, and toxic gases from the room. To put the electric sanitizing device in the room-wide sterilization mode, the user may turn on the device and then open the lid, such that the UVC lamp faces upward. Then, the user may press and hold the basket spin button 1253 for 5 seconds to initiate the room-wide sterilization operation. The ozone generator and air pump start immediately, and the UV lamp may start 2 minutes later to enable the user to leave the room. After 30 minutes, the ozone generator and the UV light turn off, and the machine will emit an audible sound to signal to the user that the sterilization process has been completed. The device will then automatically shut down. Thus, an advantage is that various acute illnesses caused by airborne molds or toxic gases may be prevented.

It should be understood that each operation taken in the above methods may be reflected in the display 1212, as an example. As shown in FIG. 12, the display 1212 may be a screen (e.g., LCD screen) comprising illustrations that may be lit up by a built-in LED, as an example. As shown, each illustration on the display 1212 may correspond to an illustration on the buttons, to indicate proper response by the device to the user's commands. As an example, when the user actuates the electronics button 1251, the electronics illustration 1251A may light up on the display. Additionally, the digits 1259 may light up on the display 1212 to indicate to the user the amount of time left (e.g., 07) during any given operation, as an example.

It should be understood that the electric sanitizing device disclosed herein may be adapted to respond to the user's commands by means other than the buttons. As an example, a mobile application may be connected wirelessly to the device for operation of the device via a cellphone. Additionally, the control panel may be adapted to be touchscreen. Furthermore, the arrangement, illustrations, and style of the control panel and display screen are shown as examples and should not be interpreted as being limiting.

It may be advantageous to set forth definitions of certain words and phrases used in this patent document. The term "couple" and its derivatives refer to any direct or indirect communication between two or more elements, whether or not those elements are in physical contact with one another. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

It should be understood that although the term "plastic" has been used throughout this disclosure to refer generally to consumer and household items made of plastic, the plastic must be 03 acceptable to ensure compatibility with the provided cleaning methods. It should be understood that the "contact tank" refers to the bottom portion of the interior of the treatment zone. The "cleaning chamber" refers to the upper portion of the treatment zone, where the basket is located.

Further, as used in this application, "plurality" means two or more. A "set" of items may include one or more of such items. Whether in the written description or the claims, the terms "comprising," "including," "carrying," "having," "containing," "involving," and the like are to be understood to be open-ended, i.e., to mean including but not limited to. Only the transitional phrases "consisting of" and "consisting essentially of," respectively, are closed or semi-closed transitional phrases with respect to claims.

If present, use of ordinal terms such as "first," "second," "third," etc., in the claims to modify a claim element does not by itself connote any priority, precedence or order of one claim element over another or the temporal order in which acts of a method are performed. These terms are used merely as labels to distinguish one claim element having a certain name from another element having a same name (but for use of the ordinal term) to distinguish the claim elements. As used in this application, "and/or" means that the listed items are alternatives, but the alternatives also include any combination of the listed items.

Throughout this description, the aspects, embodiments or examples shown should be considered as exemplars, rather than limitations on the apparatus or procedures disclosed or claimed. Although some of the examples may involve specific combinations of method acts or system elements, it should be understood that those acts and those elements may be combined in other ways to accomplish the same objectives.

Acts, elements and features discussed only in connection with one aspect, embodiment or example are not intended to be excluded from a similar role(s) in other aspects, embodiments or examples.

Aspects, embodiments or examples of the invention may be described as processes, which are usually depicted using a flowchart, a flow diagram, a structure diagram, or a block diagram. Although a flowchart may depict the operations as a sequential process, many of the operations can be performed in parallel or concurrently. In addition, the order of the operations may be re-arranged. With regard to flowcharts, it should be understood that additional and fewer steps may be taken, and the steps as shown may be combined or further refined to achieve the described methods.

If means-plus-function limitations are recited in the claims, the means are not intended to be limited to the means disclosed in this application for performing the recited function, but are intended to cover in scope any equivalent means, known now or later developed, for performing the recited function.

Claim limitations should be construed as means-plus-function limitations only if the claim recites the term "means" in association with a recited function.

If any presented, the claims directed to a method and/or process should not be limited to the performance of their steps in the order written, and one skilled in the art can readily appreciate that the sequences may be varied and still remain within the spirit and scope of the present invention.

Although aspects, embodiments and/or examples have been illustrated and described herein, someone of ordinary skills in the art will easily detect alternate of the same and/or equivalent variations, which may be capable of achieving the same results, and which may be substituted for the aspects, embodiments and/or examples illustrated and described herein, without departing from the scope of the invention. Therefore, the scope of this application is intended to cover such alternate aspects, embodiments and/or examples. Hence, the scope of the invention is defined by the accompanying claims and their equivalents. Further, each and every claim is incorporated as further disclosure into the specification.

What is claimed is:

1. An electric sanitizing device for cleaning an item, the electric sanitizing device comprising:
    a lid having a top surface and a bottom surface, the lid comprising:
        an ultraviolet (UV) lamp, the UV lamp being positioned above a transparent glass window mounted in the bottom surface, such that the UV lamp can emit UV light through the glass window;
        a spray nozzle disposed in the bottom surface; and
        a vent housing an activated carbon filter, the vent extending between the bottom and the top surfaces;
    a body pivotally attached to the lid, the body and the lid being adapted to engage in a closed position, so as to form a seal, the body comprising:
        a cleaning chamber within the body, wherein a bottom portion of the cleaning chamber forms a contact tank;
        a dispersion stone and a water inlet disposed in a bottom floor of the cleaning chamber;
        a retention plate sitting atop the bottom floor and a filter plate sitting atop the retention plate;
        a basket sitting atop the filter plate, the basket being adapted to receive the item, such that the UV lamp, the spray nozzle and the vent are positioned over the item when the lid engages the body in the closed position; and
        a control panel; and
    an electronics compartment disposed below the body, the electronics compartment being encased by a base, the electronics compartment comprising:
        an ozone generator having an air pump, the ozone generator being in fluid communication with the dispersion stone;
        a rotating motor adapted to rotate the basket;
        a water pump being in fluid communication with the spray nozzle and the contact tank; and a controller in electrical communication with the control panel, the controller being adapted to automatically operate the ozone generator, the rotating motor, the water pump and the UV lamp, according to a user's command entered via the control panel;

wherein the ozone generator is adapted to generate ozone gas and the air pump is adapted to pump the ozone gas through the dispersion stone into the contact tank;

wherein, when water is present in the contact tank, the ozone gas is caused to be mixed with and dissolved within the water, such that the dissolved ozone gas can be acted upon by the UV light in the cleaning chamber to cause a creation of hydroxyl radicals for disinfecting the item and further such that the UV light and the activated carbon filter can convert undissolved ozone gas into oxygen before the oxygen exits via the vent.

2. The electric sanitizing device of claim 1, wherein the item is a food item or a non-electric item.

3. The electric sanitizing device of claim 1, wherein the lid further comprises a transparent viewing portal disposed in the top surface of the lid, the viewing portal being positioned above the UV lamp and the transparent glass window.

4. The electric sanitizing device of claim 1, further comprising:
 a drain nozzle disposed in a side of the body, the drain nozzle being connected to the contact tank; and
 a rotary knob disposed above the drain nozzle, wherein a rotation of the rotary knob is adapted to cause a release of any liquid in the contact tank out of the drain nozzle.

5. The electric sanitizing device of claim 1, wherein the basket comprises:
 a plurality of slits disposed throughout a surface of the basket; and
 an ice cover removably associated with the basket, the ice cover fitting within the basket and having a plurality of slits disposed throughout a surface of the ice cover.

6. The electric sanitizing device of claim 1, further comprising a water level view disposed in a side of the body, the water level view being connected to the bottom floor of the cleaning chamber via a tube.

7. The electric sanitizing device of claim 1, wherein the water pump is attached to the water inlet via a first tube, and wherein the water pump is attached to the spray nozzle via a second tube, such that the water pump is adapted to pump the water mixed with the ozone from the cleaning chamber to the spray nozzle via the first and the second tubes.

8. The electric sanitizing device of claim 1, wherein the retention plate comprises:
 an inner lip disposed circularly about a center of the retention plate;
 an outer lip disposed circularly along an outer edge of the retention plate, the outer lip being adapted to form a friction seal with a wall of the cleaning chamber, so as to form the contact tank between the bottom floor of the cleaning chamber and the retention plate;
 a plurality of inner passages disposed around the inner lip, wherein each inner passage of the plurality of inner passages has a first diameter and a first length; and
 a plurality of outer passages arranged circularly around the plurality of inner passages, wherein each outer passage of the plurality of outer passages has a second diameter and a second length;
 wherein the second diameter is larger than the first diameter, and the second length is larger than the first length, such that a pressure differential can be established within the contact tank when water is present, and thus a release of undissolved ozone gas via the plurality of inner passages can be caused.

9. The electric sanitizing device of claim 8, wherein the device is adapted to receive a volume of water of about 32-40 fluid ounces, wherein the outer passages are configured to allow a flow rate of the water from the cleaning chamber to the contact tank of about 10 ounces per minute, wherein the device is adapted to allow about 0.5 parts-per-million (ppm) in volume to be dissolved in the contact tank, and wherein the UV lamp is adapted to emit the UV light at about 254 nanometers (nm) in wavelength.

* * * * *